(12) United States Patent
Tsurumi

(10) Patent No.: US 8,958,686 B2
(45) Date of Patent: Feb. 17, 2015

(54) INFORMATION PROCESSING DEVICE, SYNCHRONIZATION METHOD, AND PROGRAM

(75) Inventor: Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 150 days.

(21) Appl. No.: 13/248,584

(22) Filed: Sep. 29, 2011

(65) Prior Publication Data

US 2012/0093486 A1    Apr. 19, 2012

(30) Foreign Application Priority Data

Oct. 15, 2010    (JP) .............................. P2010-232171

(51) Int. Cl.
```
H04N 5/94       (2006.01)
H04N 5/91       (2006.01)
G11B 27/034     (2006.01)
G11B 27/28      (2006.01)
H04N 21/422     (2011.01)
H04N 21/432     (2011.01)
H04N 21/433     (2011.01)
H04N 21/81      (2011.01)
G11B 20/10      (2006.01)
H04N 5/765      (2006.01)
H04N 9/82       (2006.01)
```

(52) U.S. Cl.
CPC ................ *H04N 5/91* (2013.01); *G11B 27/034* (2013.01); *G11B 27/28* (2013.01); *H04N 21/42203* (2013.01); *H04N 21/4325* (2013.01); *H04N 21/4334* (2013.01); *H04N 21/8106* (2013.01); *G11B 2020/10537* (2013.01); *H04N 5/765* (2013.01); *H04N 9/8205* (2013.01)
USPC .......................................... 386/248; 386/239

(58) Field of Classification Search
None
See application file for complete search history.

(56) References Cited

U.S. PATENT DOCUMENTS

| | | | |
|---|---|---|---|
| 2009/0144071 A1* | 6/2009 | Saito et al. ........................ | 705/1 |
| 2010/0091113 A1* | 4/2010 | Morioka et al. ............ | 348/207.1 |
| 2011/0225608 A1* | 9/2011 | Lopatecki et al. .............. | 725/34 |

FOREIGN PATENT DOCUMENTS

JP    2008-27860    9/2008

* cited by examiner

*Primary Examiner* — William C Vaughn, Jr.
*Assistant Examiner* — Eileen Adams
(74) *Attorney, Agent, or Firm* — Sony Corporation

(57) ABSTRACT

An information processing system including a first apparatus that reproduces content, acquires behavior data corresponding to a viewer of the reproduced content, and stores the acquired behavior data and synchronization data indicating a timing of the reproduced content with respect to the acquired behavior data. The system also includes a second apparatus that reproduces the content with the behavior data based on the stored synchronization data.

20 Claims, 25 Drawing Sheets

FIG. 6 camera log

| time | rec status |
|---|---|
| 00:00:00:00 | start |
| 00:06:00:00 | stop |

FIG. 8

| time | CONTENT MANIPULATION | CONTENT FRAME |
|---|---|---|
| 00:01:00:00 | play | 0 |
| 00:02:00:00 | play end | 1800 |
| 00:02:00:00 | pause | 1800 |
| 00:02:30:00 | pause end | 1800 |
| 00:02:30:00 | play | 1800 |
| 00:03:30:00 | play end | 3600 |
| 00:03:30:00 | prev.speed1 | 3600 |
| 00:03:40:00 | prev.speed1 end | 3000 |
| 00:03:40:00 | play | 3000 |
| 00:04:40:00 | play end | 4800 |
| 00:04:40:00 | next chapter | 4800 |
| 00:04:41:00 | next chapter end | 6000 |
| 00:04:41:00 | play | 6000 |
| 00:05:41:00 | play end | 7800 |
| 00:05:41:00 | stop | 7800 |
| 00:05:41:00 | stop end | 7800 |

FIG. 15

| time | behavior | content frame |
|---|---|---|
| 00:02:35:00 | smile face | 1950 |
| 00:02:40:00 | point by finger | 2100 |
| 00:02:45:00 | point by finger end | 2250 |
| 00:02:55:00 | smile face end | 2550 |
| ⋮ | ⋮ | ⋮ |

FIG. 23

| time | CONTENT MANIPULATION | CONTENT FRAME |
|---|---|---|
| 00:01:00:00 | play | 0 |
| 00:02:00:00 | play end | 1800 |
| 00:02:00:00 | forward | 1800 |
| 00:02:40:00 | forward end | 3600 |
| 00:02:40:00 | play | 3600 |
| 00:07:40:00 | play end | 11600 |
| 00:07:41:00 | stop | 11600 |
| 00:07:41:00 | stop end | 11600 |

INFORMATION PROCESSING DEVICE, SYNCHRONIZATION METHOD, AND PROGRAM

CROSS REFERENCE TO RELATED APPLICATIONS

This application claims the benefit of priority under 35 U.S.C. §119 to Japanese Patent Application JP 2010-232171 filed in the Japan Patent Office on Oct. 15, 2010, the entire content of which is hereby incorporated by reference.

BACKGROUND

The present disclosure relates to an information processing device, a synchronization method, and a program.

Recently, users have not only watched and enjoyed content of moving pictures or the like imaged by an imaging device, but have also given added value to content by editing the content or adding music to the content.

For example, a content imaging device capable of easily generating a digest by narrowing down the number of content scenes or clips has been proposed (see Japanese Patent Application Laid-open No. 2008-227860).

SUMMARY

All techniques for giving added value to content described above include editing content on the basis of the content so that it is possible to watch and enjoy the edited content.

However, there is no technique for further giving a conversation or a reaction of a viewer while watching content or conveying excitement or an atmosphere of a location to the content as added value.

Content creators are curious about the impressions of viewers, but there is no useful technique to know a realistic sensation when the viewers watch content.

It is desirable to provide a novel and improved information processing device, synchronization method, and program capable of further giving added value to content.

According to a first exemplary embodiments, the disclosure is directed to an information processing system including a first apparatus that reproduces content, acquires behavior data corresponding to a viewer of the reproduced content, and stores the acquired behavior data and synchronization data indicating a timing of the reproduced content with respect to the acquired behavior data. The system also includes a second apparatus that reproduces the content with the behavior data based on the stored synchronization data.

According to another exemplary embodiment, the disclosure is directed to an information processing method that includes reproducing content by a first apparatus, acquiring, by the first apparatus, behavior data corresponding to a viewer of the reproduced content, storing, at the first apparatus, the acquired behavior data and synchronization data indicating a timing of the reproduced content with respect to the acquired behavior data, and reproducing, by a second apparatus, the content with the behavior data based on the stored synchronization data.

According to another exemplary embodiment, the disclosure is directed to a non-transitory computer-readable medium including computer program instructions, which when executed by a computer, cause the computer to perform a method that includes reproducing content, acquiring behavior data corresponding to a viewer of the reproduced content, and storing the acquired behavior data and synchronization data indicating a timing of the reproduced content with respect to the acquired behavior data.

According to the embodiments of the present disclosure described above, added value can be further given to content.

BRIEF DESCRIPTION OF THE DRAWINGS

FIG. 6 is a diagram showing an example of camera logs stored in a camera video data DB according to the same embodiment;

FIG. 8 is a diagram showing an example of content manipulation logs according to the same embodiment;

FIG. 15 is a diagram showing an example of user feature logs according to the same embodiment.

FIG. 23 is a diagram showing an example of content manipulation logs according to the same embodiment;

DETAILED DESCRIPTION OF THE EMBODIMENT(S)

Figure 1:
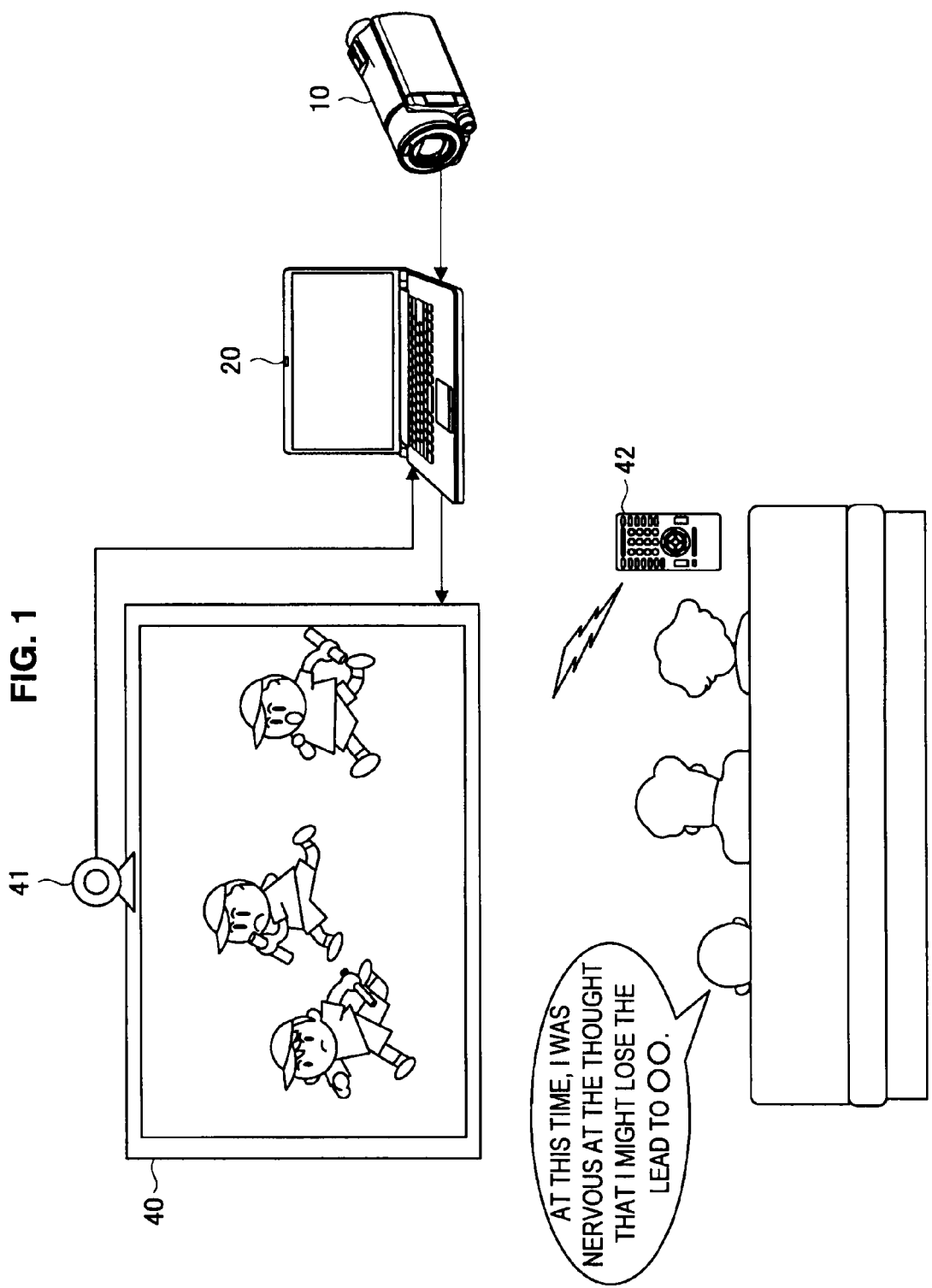
FIG. 1 is a diagram illustrating an overview of a data generation device according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Description will be given in the following order.
1. First Embodiment
(1-1) Overview Description of Content Synchronous Reproduction System
(1-2) Data Generation Device
(1-3) Data Synthesis Device
2. Second Embodiment (User Feature Analysis)
(2-1) Data Generation Device
(2-2) Data Synthesis Device
3. Third Embodiment (Synthesis in Series)
4. Fourth Embodiment (Synthesis in Parallel)
5. Hardware Configuration of Information Processing Device
6. Summary <1. First Embodiment>

[1-1. Overview Description of Content Synchronous Reproduction System]

First, an overview of the content synchronous reproduction system using a data generation device 20 and a data synthesis device 50 according to the first embodiment of the present disclosure will be described with reference to FIGS. 1 to 4. Behavior data used in this specification comprehensively includes data indicating an appearance (reaction) of a user or a watching state such as a manipulation of content or the like. In this embodiment, camera video data in which a user is a subject and content manipulation data indicating a content manipulation of the user are used as an example of the behavior data.

(Data Generation Device 20)

The data generation device 20, which reproduces content data, acquires behavior data such as camera video data in which the user is the subject while watching or content manipulation data indicating a content manipulation by the user, and generates synchronization data for synchronizing the behavior data with the content data, will be described with reference to FIG. 1.

The data generation device 20 shown in FIG. 1 receives content data from a recording device 10 such as a handy-cam and displays the content data on a display device 40. A camera 41 installed on the display device 40 images the user who watches content displayed on the display device 40 and sends an imaging result to the data generation device 20 as camera video data.

The data generation device 20 receives inputs of content play, pause, and fast-forward manipulations and the like, which are performed by the user using a remote controller 42, as content manipulation data.

As described above, the data generation device 20 acquires, for example, camera video data (including image (imaging) data and collected sound data) or content manipulation data, as behavior data indicating behavior of the user who watches content.

(Data Synthesis Device 50)

Next, the data synthesis device 50, which synchronizes behavior data such as camera video data, content manipulation data, or the like of a first user acquired by the above-described data generation device 20 with content data when another user watches the above-described content data, will be described with reference to FIG. 2. Another user (second user) can also watch and enjoy a watching state of the first user in addition to the content data by synchronizing the behavior data of the first user with the content data.

Figure 2:
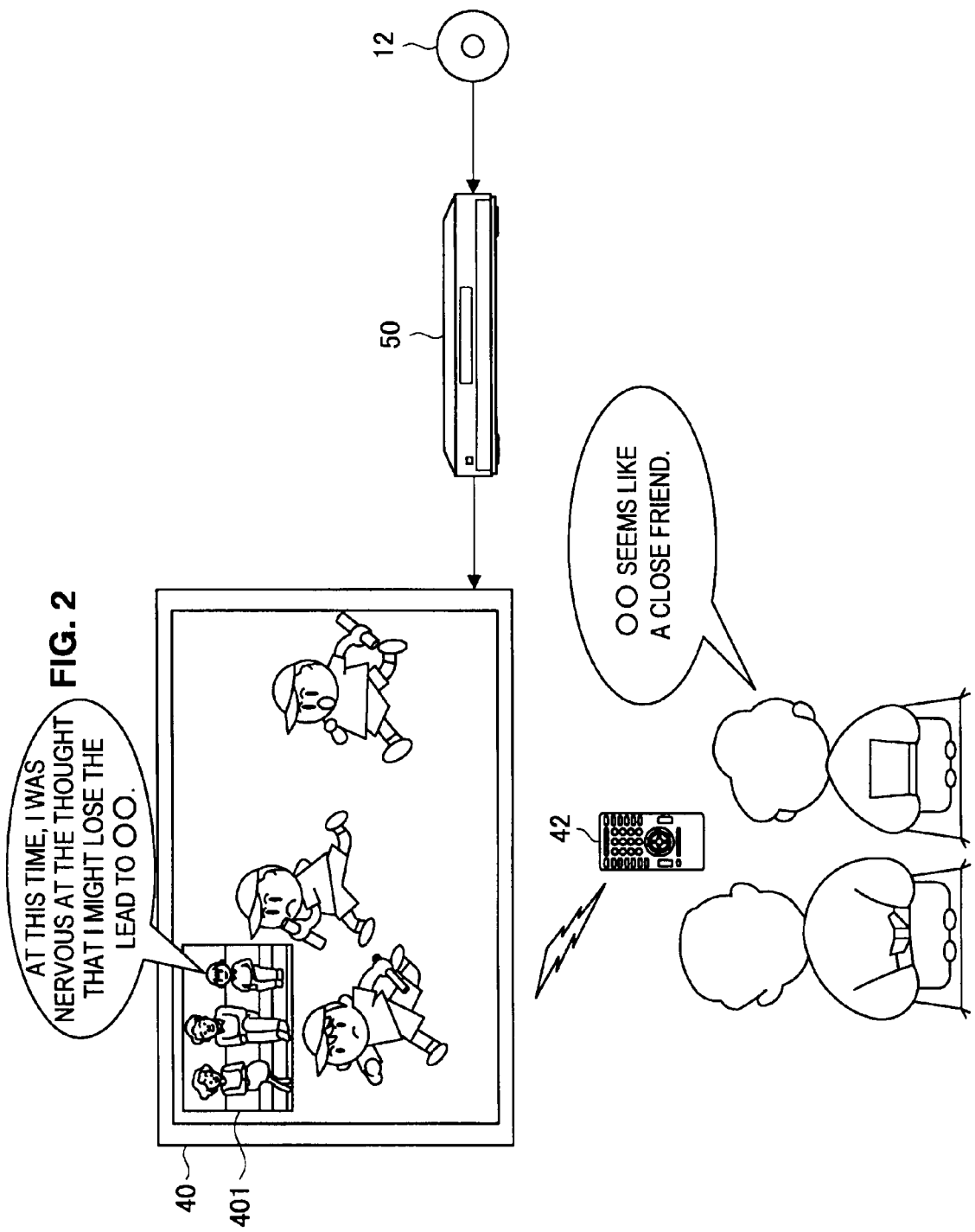
FIG. 2 is a diagram illustrating an overview of a data synthesis device, which performs synchronous reproduction control according to the same embodiment.

A recording medium 12 shown in FIG. 2 (for example, a digital versatile disc (DVD)) includes the content data, the camera video data of the first user, and the content manipulation data of the first user. The data synthesis device 50, which acquires data from the recording medium 12, synchronizes the content data and the camera video data or the content manipulation data.

For example, when the data synthesis device 50 synchronizes and reproduces the content data and the camera video data of the first user, a camera video x (401) may be synthesized with the content data and displayed on the display device 40 as shown in FIG. 2. At this time, the two are synchronized on the basis of a time line, so that it can be seen which reaction of the first user is shown at which timing of the content data and hence new added value is generated in content.

(Application Example)

The application example of the content synchronous reproduction system using the data generation device 20 and the data synthesis device 50 described above will be described. For example, if first users are a family including a father, a mother, and a child as shown in FIG. 1, the data generation device 20 reproduces a video (content data) of a kindergarten athletic event recorded on a handy-cam. In this case, the data generation device 20 acquires camera video data in which the first watching users are subjects from the camera 41. Next, the video of the athletic event and the camera video data imaged by the camera 41 are sent to grandparents who are second users. At the side of the grandparents, the video of the athletic event and the camera video data in which the appearance of their son's family watching the video is reflected are synchronized and reproduced by the data synthesis device 50 as shown in FIG. 2. Thereby, the grandparents can also enjoy the appearance of their son's family watching the video of the athletic event while enjoying the video of their grandson's athletic event.

The data synthesis device 50 acquires data from the recording medium 12 in the example shown in FIG. 2, but a data acquisition method of this embodiment is not limited thereto. For example, the data synthesis device 50 and the data generation device 20 may be connected via a network, and the data synthesis device 50 may acquire data via the network.

Next, another application example of the content synchronous reproduction system will be described. In this application example, camera video data, in which other users who watch content data are subjects, or a content manipulation of the other users is synchronized, so that new added value is generated in content.

Specifically, the video of the kindergarten athletic event (content data) is first sent to the other users (a grandfather and a grandmother), and the data generation device 20 at the side of the grandfather and the grandmother acquires behavior data such as camera video data in which the grandparents are subjects while watching or content manipulation data by the grandparents. Then, the video of the athletic event and the behavior data such as the camera video data are recorded in the recording medium 12 and are sent back from the side of the grandfather and the grandmother to their son's family. The data synthesis device at the side of their son's family synchronously reproduces the content data and the camera video data or the content manipulation data as described above.

For example, when the content data and the content manipulation data are synchronized and reproduced, the data synthesis device 50 controls a content reproduction according to the content manipulation data. Therefore, a content manipulation such as a rewind or fast-forward manipulation performed by another user is re-created (see FIG. 3). At this time, the two are synchronized on the basis of a time line, so that it can be seen what manipulations were performed by another user at which timing of the content data and hence new added value is generated in content.

(Operation Processing)

Figure 4:
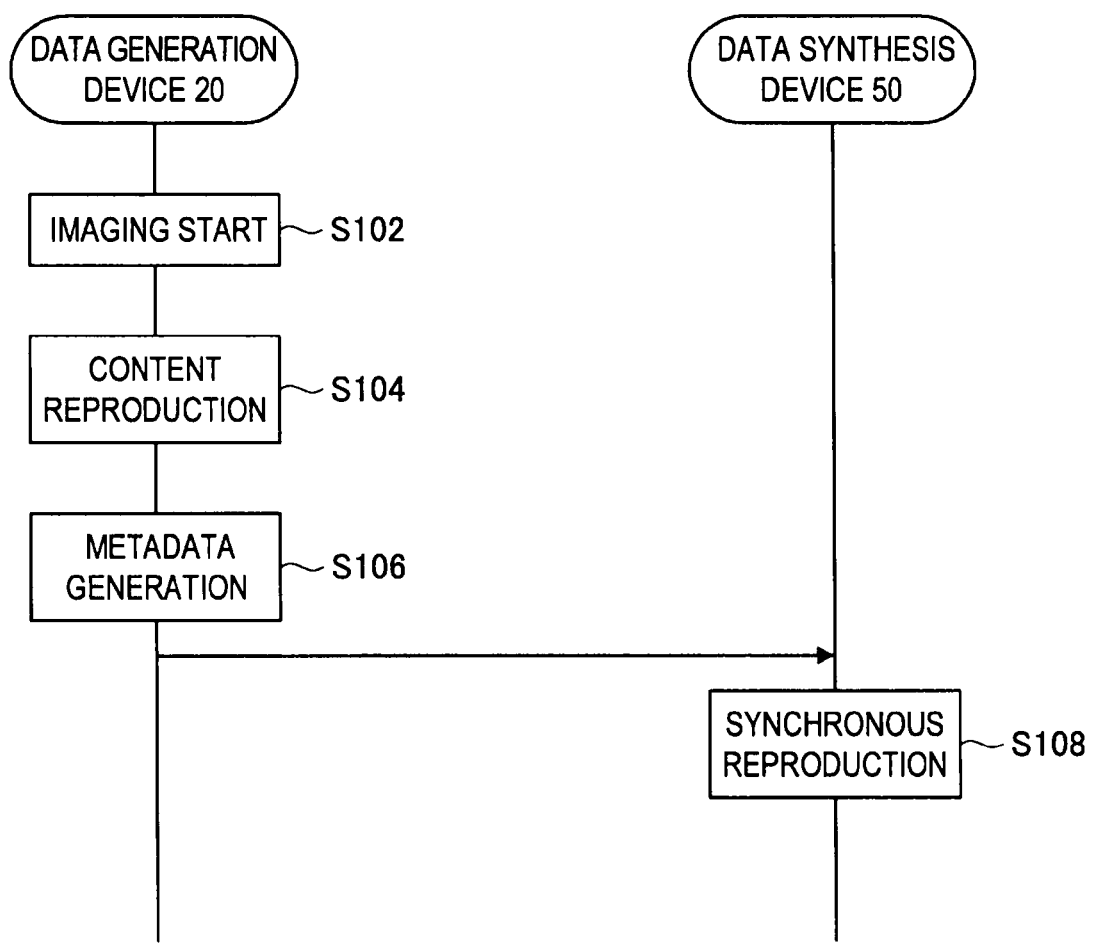
FIG. 4 is a time chart showing operation processing of a content synchronous reproduction system according to the same embodiment.

Next, the operation processing of the above-described content synchronous reproduction system will be described with reference to FIG. 4. As shown in FIG. 4, the data generation device 20 starts an imaging operation by the camera 41, and images a user who watches content (S102). Then, the content is reproduced on the display device 40 (S104). Then, metadata, which is synchronization data, is generated (S106). The metadata will be described later using FIGS. 5, 7, and 8.

On the other hand, the data synthesis device 50 performs a synchronous reproduction on the basis of content data, camera video data, and metadata acquired from the data generation device 20 (S108).

The operation processing of the content synchronous reproduction system according to this embodiment has been described above using the flowchart of FIG. 4. Here, the content data described in this specification may be still-image data, music data, and games as well as videos imaged by the above-described handy-cam, videos of TV broadcasting, moving-picture data of moving pictures released on the Internet, etc. The data synthesis devices 50 according to this embodiment synchronize content data and camera video data as an example, but only sound data or image data may be synchronized.

[1-2. Data Generation Device]

(Configuration)

Figure 5:
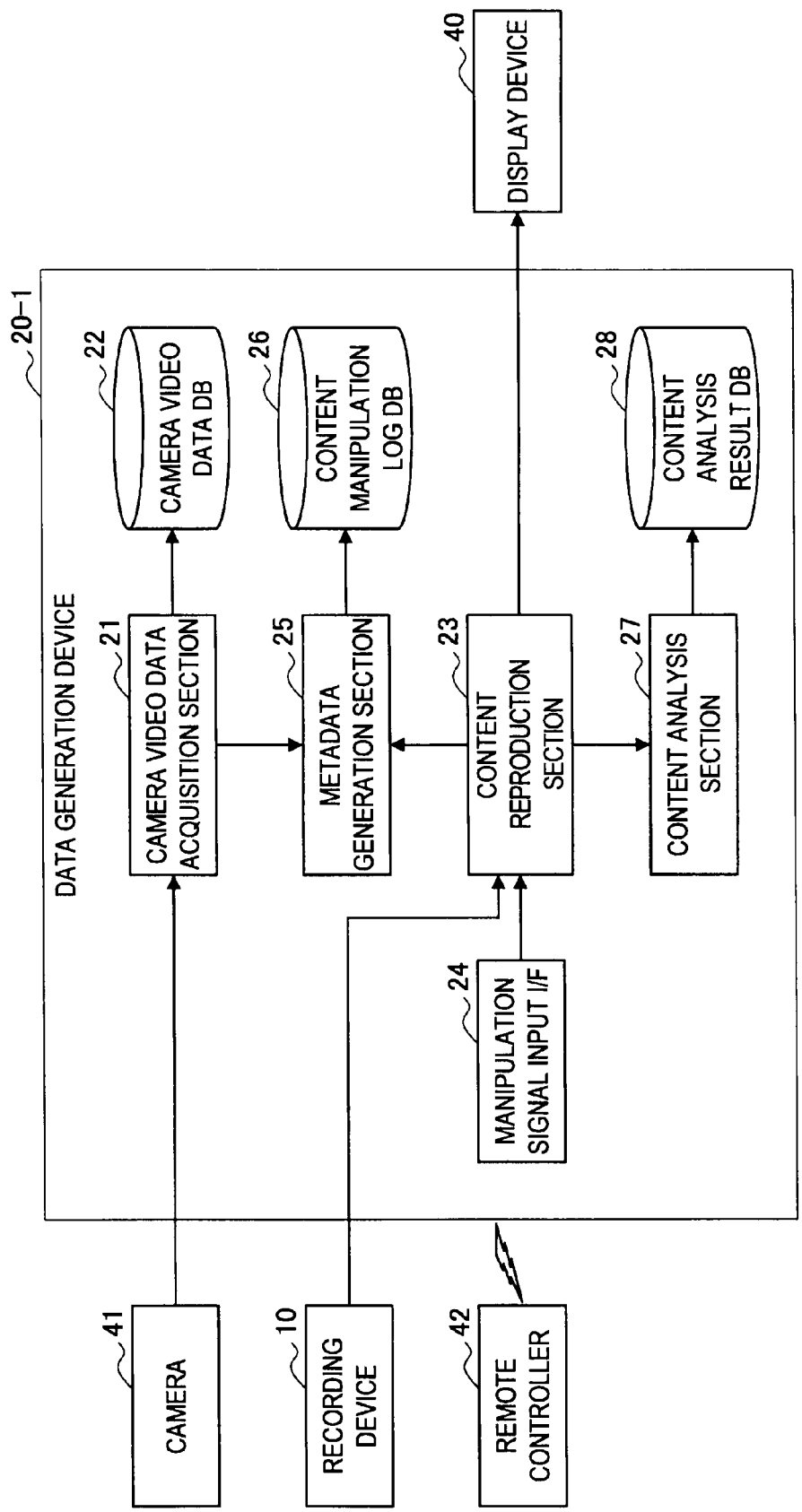
FIG. 5 is a diagram showing a configuration of a data generation device according to the same embodiment.

Next, the configuration of the data generation device 20-1 according to this embodiment will be described with reference to FIG. 5. As shown in FIG. 5, the data generation device 20-1 includes a camera video data acquisition section 21, a camera video data database (DB) 22, a content reproduction section 23, a manipulation signal input interface (I/F) 24, a metadata generation section 25, a content manipulation log DB 26, a content analysis section 27, and a content analysis result DB 28. Hereinafter, each configuration will be described.

The camera video data acquisition section 21 acquires camera video data in which a user who views content displayed on the display device 40 is a subject from the camera 41. The camera video data acquisition section 21 stores the camera video data in the camera video data DB 22 along with camera logs indicating imaging start and end times. An example of the camera logs is shown in FIG. 6.

The content reproduction section 23 controls reproduction of content data acquired from the recording device 10. The reproduction control follows a manipulation signal of a play, stop, or fast-forward manipulation or the like that is transmitted from the remote controller 42 by the user and is input from the manipulation signal input I/F 24. The manipulation signal is sent to the metadata generation unit 25 as content manipulation data. Content data reproduced by the content reproduction section 23 is displayed on the display device 40.

The metadata generation section 25 generates a content manipulation log, which is synchronization data for synchronizing content data and content manipulation data by the data synthesis device 50 later, as metadata. Data that becomes the basis of synchronization may be time data of an imaging time, a reproduction time, or the like, and each piece of sectional identification information constituting the content data may be, for example, a frame number.

In this embodiment, a time line is used on the basis of the imaging start time as an example of data that becomes the basis of synchronization and is further associated with a frame number of content data. Therefore, the metadata generation section 25 according to this embodiment generates a content manipulation log in which an imaging time (an elapsed time from the imaging start time) sent from the camera video data acquisition section 21, a frame number of content data reproduced by the content reproduction section 23, and a content manipulation are associated as metadata. A specific example in which a content manipulation log is generated will be described later with reference to FIGS. 7 and 8.

The content manipulation log generated as described above is stored in the content manipulation log DB 26 along with a content ID.

The content analysis section 27 analyzes content data reproduced by the content reproduction section 23 and detects a major area. For example, when the content data is image data, a subject area is detected as a major area. Specifically, luminance information, color information, edge information, face information, motion information, or the like is extracted from image data, a subject map is generated, and a subject area is specified. Here, the subject refers to a physical object on an image that the user is estimated to be paying attention to, that is, a physical object to which the eye of the user is estimated to be directed. Therefore, the subject is not necessarily limited to a person.

An analysis result of the content analysis section 27 (a detection result of a major area) is stored in the content analysis result DB 28. The content analysis result is used when the data synthesis device 50 decides a synthesis position later.

(Content Manipulation Log)

Next, the content manipulation log, which is synchronization data for synchronizing content manipulation data and a data position where the user has performed a content manipulation on content data, will be described using FIGS. 7 and 8. The data position where the user has performed the content manipulation is generated in association with the content manipulation data in a time line based on an imaging start time as an example in this embodiment, but the basis of synchronization is not limited thereto. For example, it may be associated with a time line on the basis of the reproduction start time or may be associated with each piece of sectional identification information constituting content data. Each piece of sectional identification information corresponds to each frame number, for example, if the content data is a moving picture.

Figure 7:
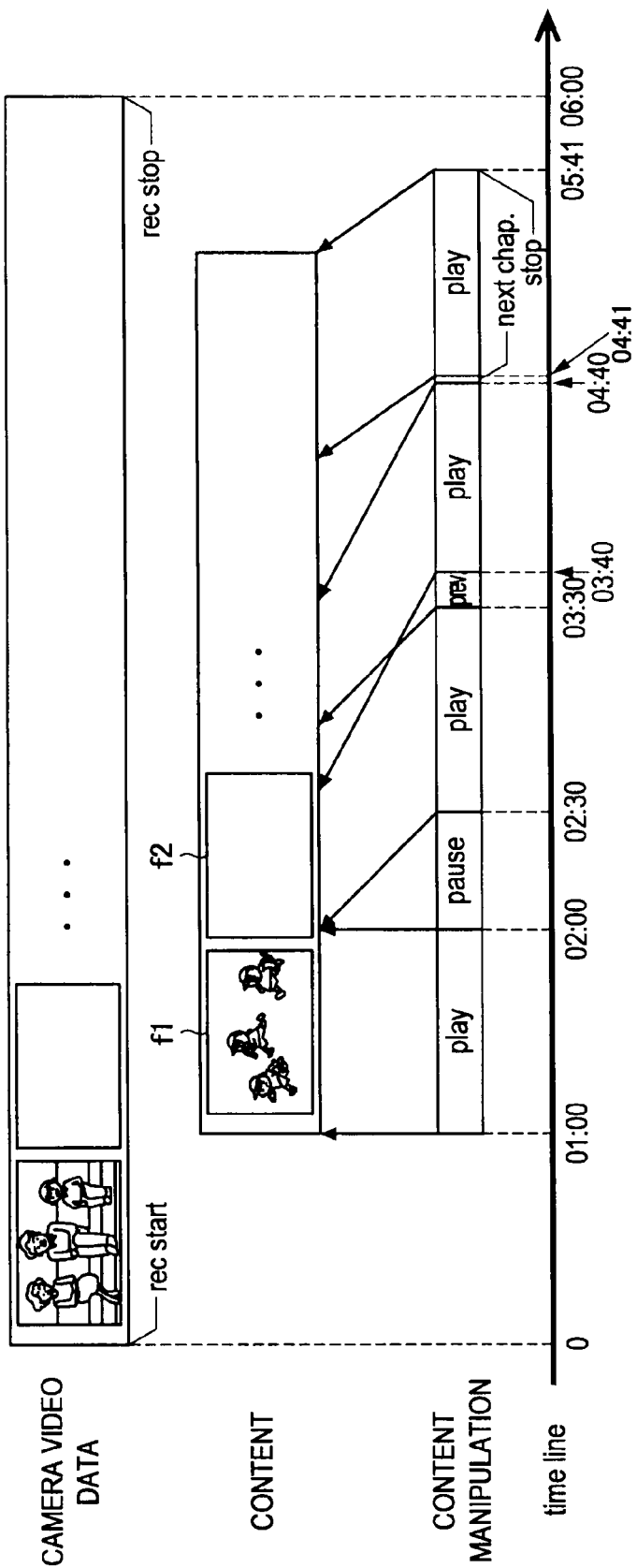
FIG. 7 is a diagram illustrating the case where an imaging time is used as the basis of synchronization according to the same embodiment.

As shown in FIG. 7, content data is associated with content manipulation data in the time line (see "time line" in FIG. 7) based on the imaging start time by the camera 41 (see "rec start" in FIG. 7) in this embodiment.

Next, content manipulation logs generated on the basis of the association shown in FIG. 7 will be described with reference to FIG. 8. First, if the user performs a play manipulation after one minute has elapsed from an imaging start as shown in FIG. 7, a content manipulation log indicating that time is 00:01:00:00, a content manipulation is "play," and a content frame (frame number) is 0 is generated as shown in FIG. 8.

Next, if the user performs a pause manipulation after one minute has elapsed from a reproduction start as shown in FIG. 7, a content manipulation log indicating that time is 00:02: 00:00, a content manipulation is "play end," and a content frame is 1800 and a content manipulation log indicating that time is 00:02:00:00, a content manipulation is "pause," and a content frame is 1800 are generated as shown in FIG. 8.

Next, if the user performs the play manipulation after 30 seconds have elapsed from the pause manipulation as shown in FIG. 7, a content manipulation log indicating that time is 00:02:30:00, a content manipulation is "pause end," and a content frame is 1800 and a content manipulation log indicating that time is 00:02:30:00, a content manipulation is "play," and a content frame is 1800 are generated as shown in FIG. 8.

Next, if the user performs a rewind (prev. speed1) manipulation after one minute has elapsed from the play manipulation as shown in FIG. 7, a content manipulation log indicating that time is 00:03:30:00, a content manipulation is "play end," and a content frame is 3600 and a content manipulation log indicating that time is 00:03:30:00, a content manipulation is "prev. speed1," and a content frame is 3600 are generated as shown in FIG. 8.

As described above, the metadata generation section 25 generates a content manipulation log, which is synchronization data, on the basis of an imaging start time. In this embodiment, the stop manipulation is performed at time 00:05:41: 00, and the reproduction of content data is stopped as shown in FIGS. 7 and 8. Thereafter, the imaging operation by the camera 41 is stopped (rec stop).

[1-3. Data Synthesis Device]
(Configuration)

Figure 9:
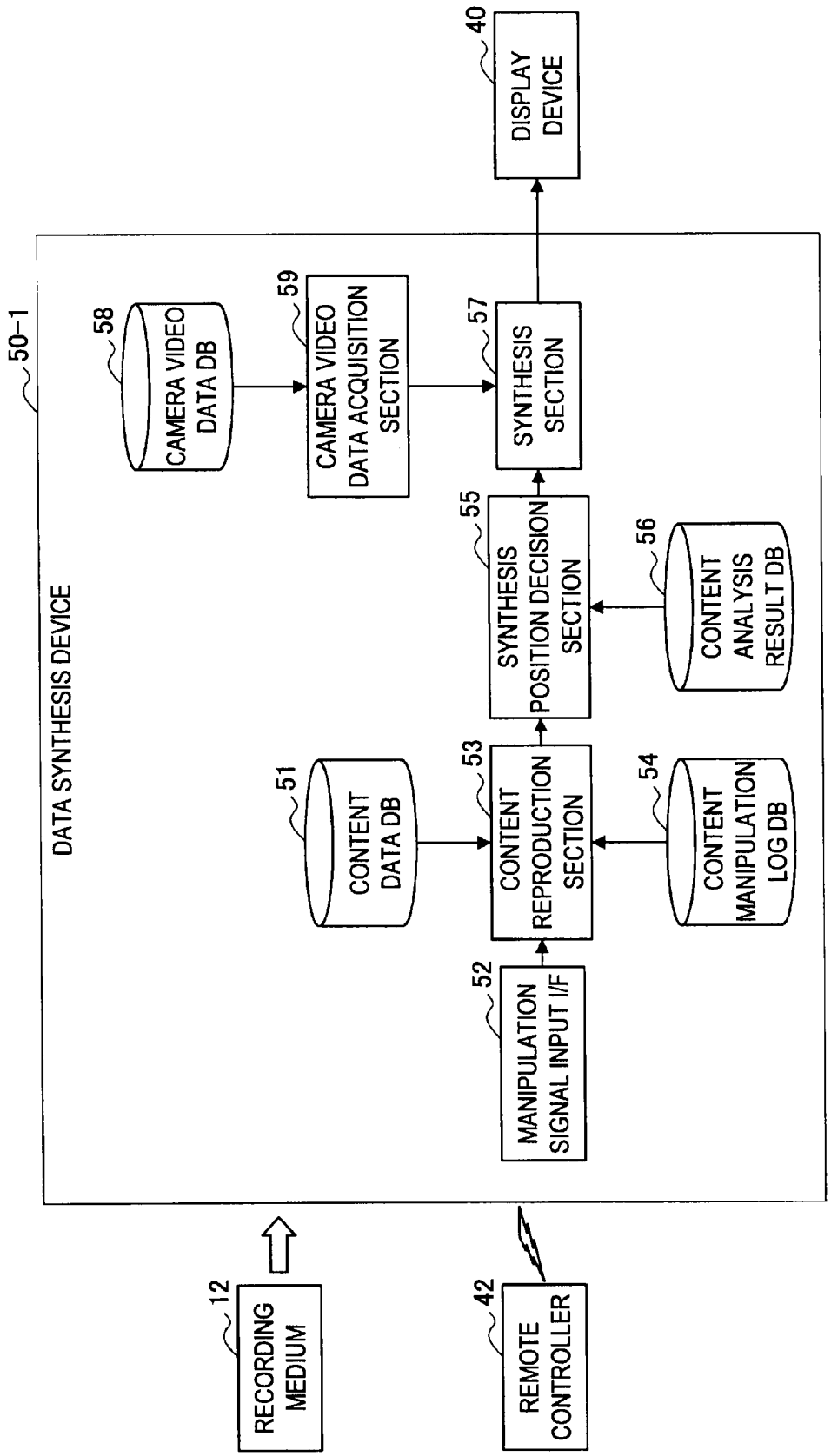
FIG. 9 is a diagram showing a configuration of a data synthesis device according to the same embodiment.

Next, a configuration of a data synthesis device 50-1 according to this embodiment will be described with reference to FIG. 9. As shown in FIG. 9, the data synthesis device 50-1 includes a content data DB 51, a manipulation signal input I/F 52, a content reproduction section 53, a content manipulation log DB 54, a synthesis position decision section 55, a content analysis result DB 56, a synthesis section 57, a camera video data DB 58, and a camera video data acquisition section 59.

Here, all data stored in the content data DB 51, the content manipulation log DB 54, the content analysis result DB 56, and the camera video data DB 58 shown in FIG. 9 is acquired from the recording medium 12. Here, content data reproduced by the above-described data generation device 20, a content manipulation log generated in association with content manipulation data by the first user in a time line, a content analysis result obtained by analyzing an attention area of content data, and camera video data obtained by imaging the user during the content data reproduction are recorded in the recording medium 12.

Hereinafter, each configuration of the data synthesis device 50-1 will be described. First, the manipulation signal input I/F 52 receives an input of a manipulation signal of the play, stop, pause, or fast-forward manipulation or the like from the remote controller 42 manipulated by the second user.

The content reproduction section 53 controls reproduction of content data. In particular, the reproduction of content data is controlled in synchronization with a content manipulation log of the first user stored in the content manipulation log DB 54, so that the data synthesis device 50-1 can re-create a content manipulation of the first user.

The synthesis position decision section 55 decides a position where the next synthesis section 57 synthesizes the content data and the camera video data on the basis of a content analysis result stored in the content analysis result DB 56. The synthesis position decision will be described later with reference to FIG. 11.

The synthesis section 57 synthesizes the content data and the camera video data acquired by the camera video data acquisition section 59 from the camera video data DB 58. At this time, the synthesis section 57 performs synthesis in the position decided by the synthesis position decision section 55. The synthesis section 57 synthesizes content data of which reproduction is controlled by re-creating a manipulation of the first user and camera video data by time synchronization. According to this time synchronization, the camera video data shows how the first user appears in which data position of the content data.

(Synthesis Content)

Next, content synthesized by the data synthesis device 50-1 (hereinafter, also referred to as synthesis content) will be described using FIG. 10.

Figure 10:
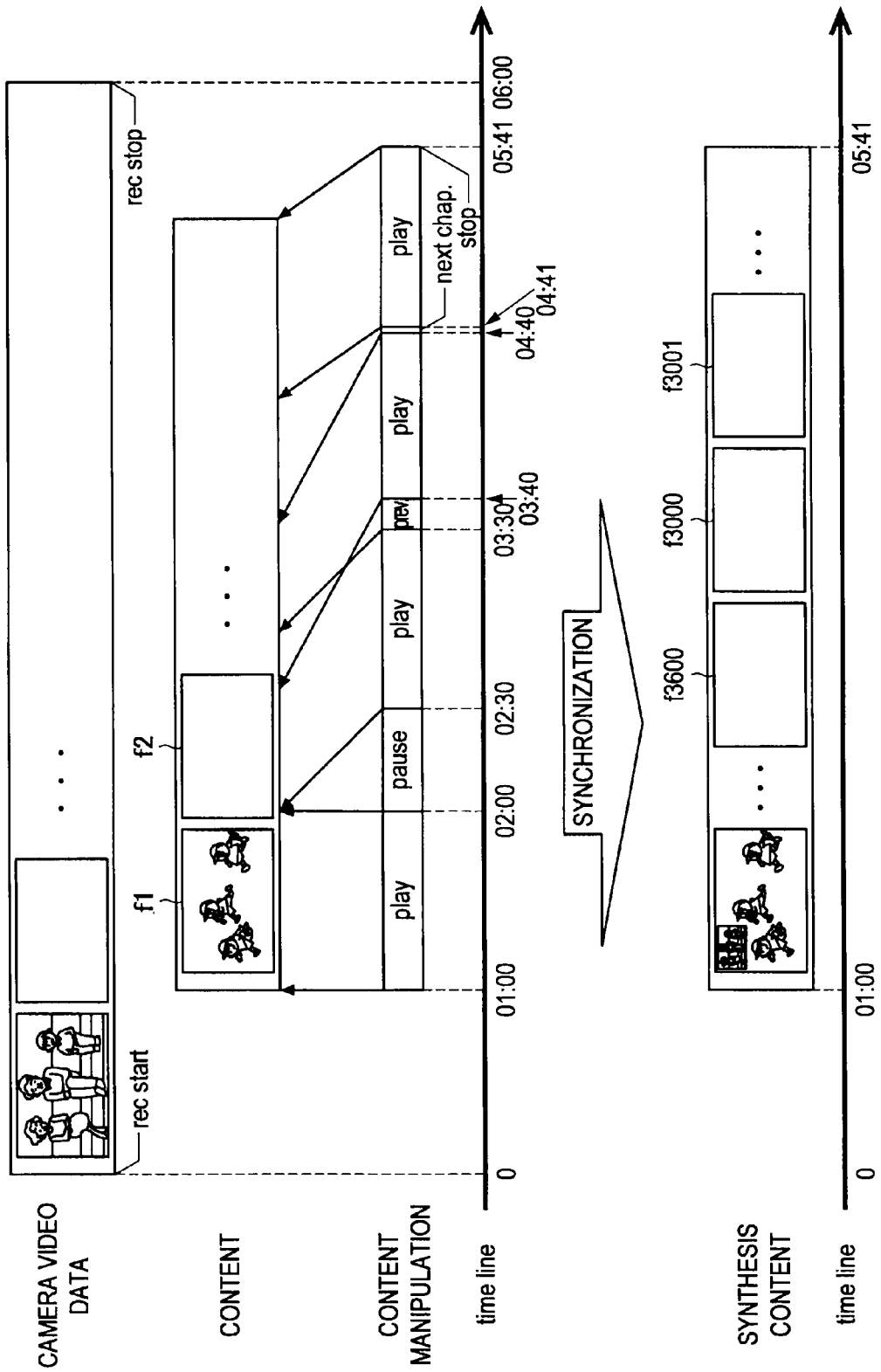
FIG. 10 is a diagram illustrating time synchronization of synthesis data generated by the data synthesis device according to the same embodiment.

First, in this embodiment, synthesis is started after camera video data corresponding to a reproduction start time is acquired without synthesizing camera video data before a content reproduction start time (time 01:00) as shown in FIG. 10. In this embodiment, reproduction ends at a content reproduction end time (time 05:41) and no camera video data is displayed after the reproduction ends as shown in FIG. 10. Synchronization between the camera video data and the content data of which reproduction is controlled on the basis of a content manipulation log is performed by the synthesis section 57 by aligning a point in time such as the content data reproduction start time.

Figure 3:
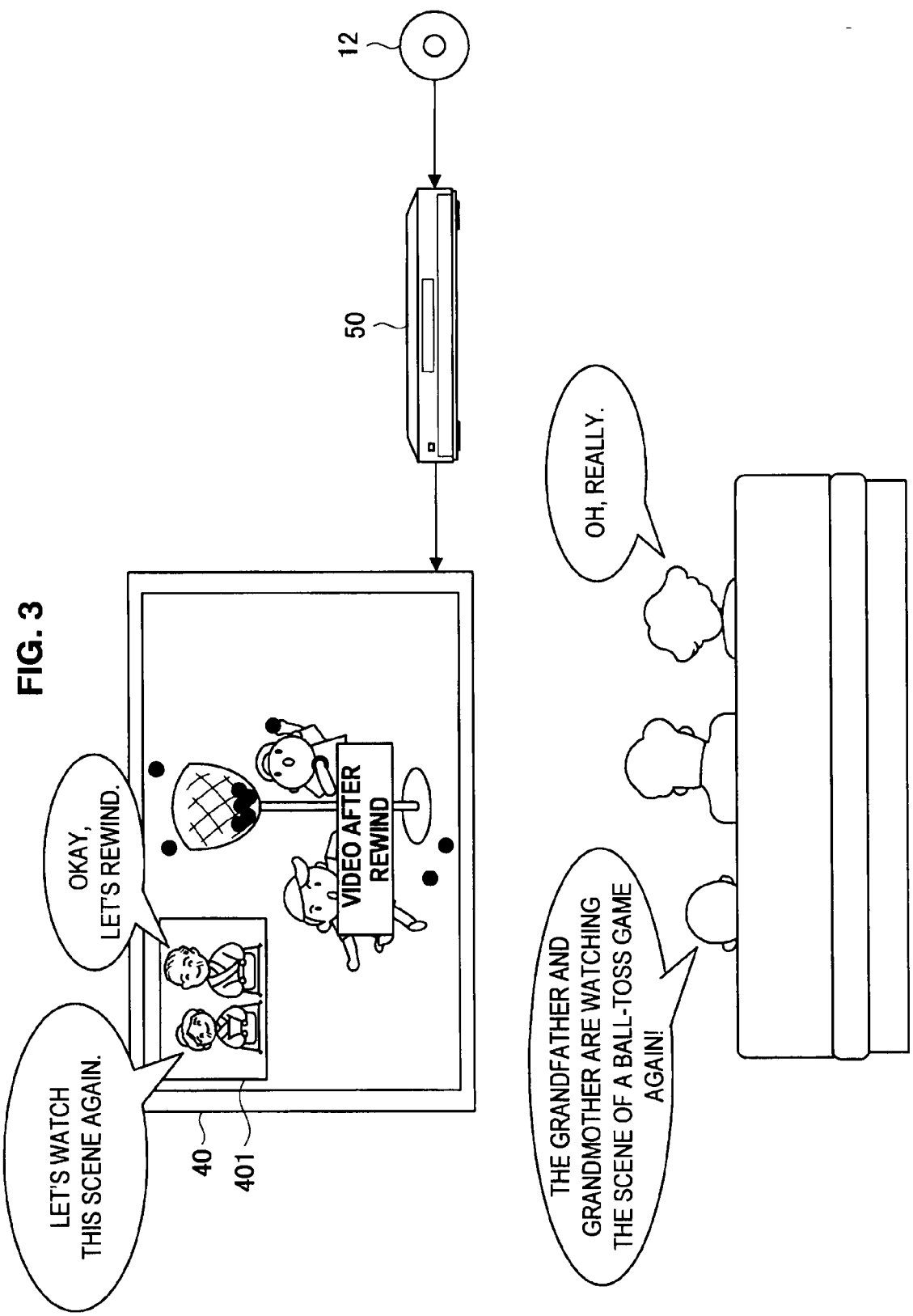
FIG. 3 is a diagram illustrating an overview of a data synthesis device, which performs synchronous reproduction control according to the same embodiment.

Next, a process in which the content reproduction section 53 controls reproduction of content data according to a content manipulation log of the first user and re-creates a manipulation of the first user will be described. For example, if attention is focused on time 00:03:30:00 in the case where content manipulation logs of the first user are those shown in FIG. 8, a manipulation of prev. speed1 is performed during 10 seconds at time of a content frame 3600 . Therefore, because the data synthesis device 50-1 performs reproduction after rewinding from the content frame 3600 to a content frame 3000, a video after the rewind is displayed on the display device 40 as shown in FIG. 3. In synthesis content shown in FIG. 10, f3000 next to f3600 is shown as a flow in order of a content frame to be reproduced by the play manipulation, but a video after rewind is displayed by a "prev." manipulation as described above between f3600 and f3000. For example, frames are displayed at intervals of a plurality of frames from f3600 to f3000.

Next, a synthesis position decision process of camera video data to be performed by the synthesis position decision section 55 on the basis of a content analysis result will be described with reference to FIG. 11. The content analysis result is a result of content analysis performed by the content analysis section 27 in the data generation device 20 as described above. Specifically, if content data is a moving picture, a major area such as a face area 402 of the moving picture or a dynamic subject area 403 is shown. The synthesis position decision section 55 decides a synthesis position of camera video data (a camera video x (401) shown in FIG. 11) within an area that does not overlap the face area 402 of the image or the subject area 403.

Figure 11:
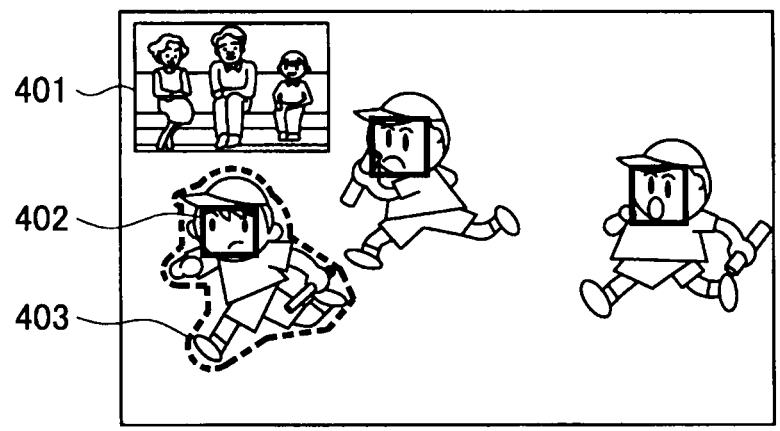
FIG. 11 is a diagram illustrating a process of deciding a synthesis position in consideration of a content analysis result by a synthesis position decision section according to the same embodiment.
Figure 12:
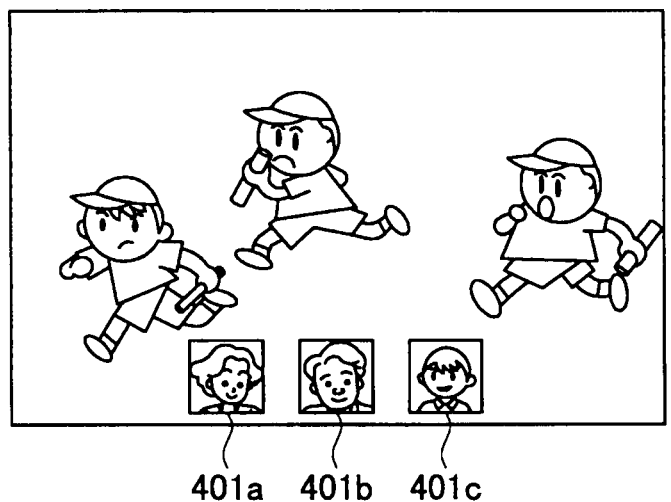
FIG. 12 is a diagram showing another example of camera video data synthesis according to the same embodiment.

A screen aspect ratio between content data and camera video data to be synthesized and reproduced by the data synthesis device 50 as shown in FIG. 11 is not limited to an example in which the content data is displayed on the entire screen of the display device 40 and the camera video data is superimposed and displayed on an end of the screen. For example, the camera video data may be displayed on the entire screen of the display device 40 and the content data may be superimposed and displayed on an end of the screen. The screen of the display device 40 may be divided into two equal parts and the content data and the camera video data may be respectively displayed on the two equal parts. As shown in FIG. 12, the content data may be displayed on the entire screen of the display device 40 and face areas 401*a*, 401*b*, and 401*c* of users may be extracted and displayed from the camera video data.

<2. Second Embodiment (User Feature Analysis)>

Next, a content synchronous reproduction system according to the second embodiment of the present disclosure will be described. In the above-described first embodiment, the data synthesis device 50-1 constantly synthesizes all data from camera video data corresponding to a content reproduction start time to camera video data corresponding to a content reproduction end time. However, the synthesis method according to an embodiment of the present disclosure is not limited thereto, and a characteristic frame of camera video data may be synthesized. For example, in this embodiment, only a scene indicating a characteristic reaction of a first user of camera video data is synthesized with content data on the basis of a user feature log generated by analyzing the camera video data representing behavior of the user. Using a user feature log generated by analyzing camera video data in a data generation device 20-2, a data synthesis device 50-2 may generate a character and synthesize the character with content data in place of the camera video data.

[2-1. Data Generation Device]

(Configuration)

Figure 13:
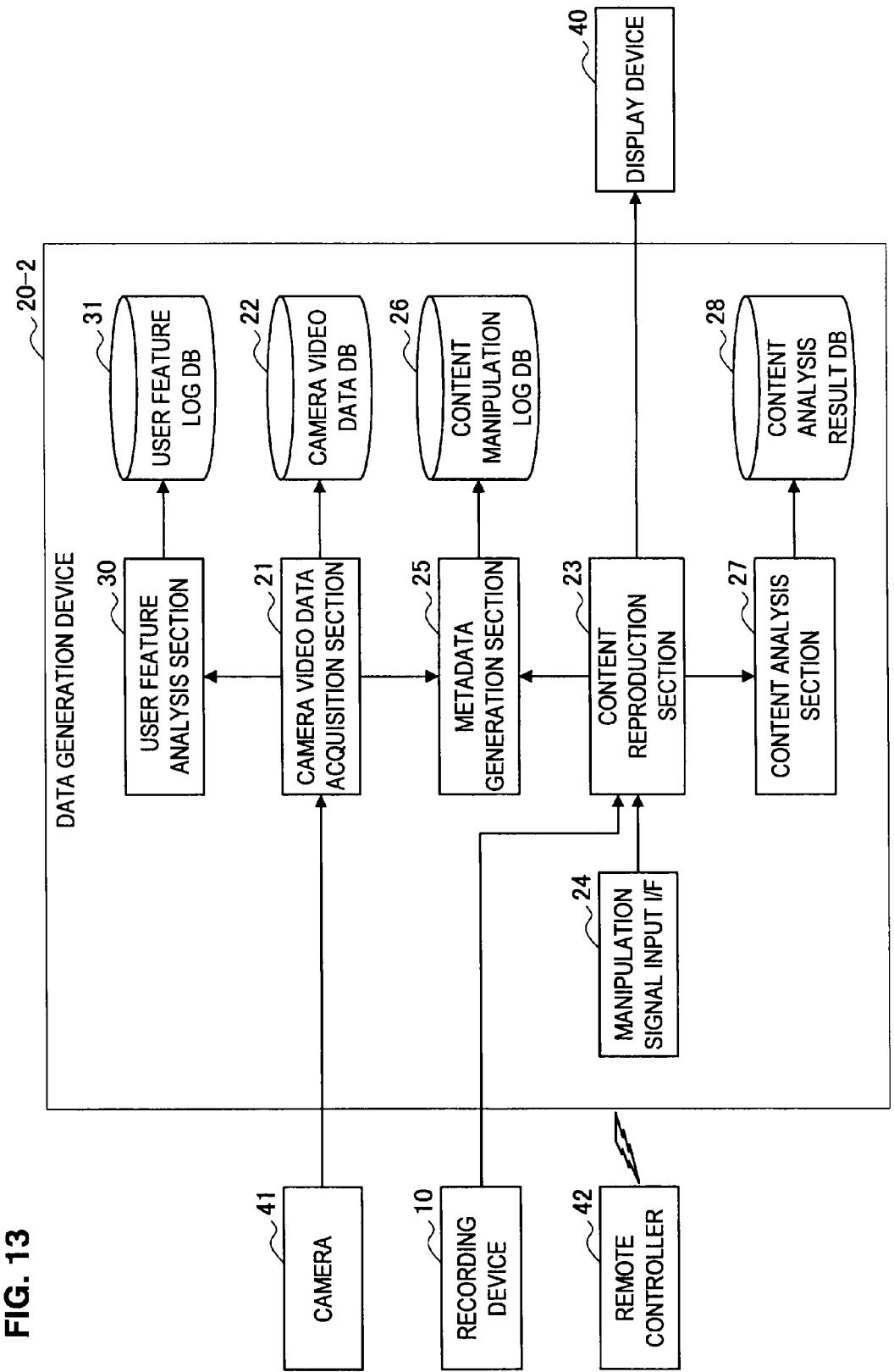
FIG. 13 is a diagram showing a configuration of a data generation device according to a second embodiment of the present disclosure.

First, the configuration of the data generation device 20-2 according to this embodiment will be described with reference to FIG. 13. As shown in FIG. 13, the data generation device 20-2 includes a camera video data acquisition section 21, a camera video data DB 22, a content reproduction section 23, a manipulation signal input I/F 24, a metadata generation section 25, a content manipulation log DB 26, a content analysis section 27, a content analysis result DB 28, a user feature analysis section 30, and a user feature log DB 31. Hereinafter, each configuration of the data generation device 20-2 will be described, but description common to the configuration of the data generation device 20-1 according to the above-described first embodiment is omitted.

The user feature analysis section 30 analyzes a user feature reflected in camera video data sent from the camera video data acquisition section 21 and detects a position where a specific reaction of a user (a smile or the like) is shown. Furthermore, the user feature analysis section 30 may generate an expression parameter available when a character such as an avatar or a computer graphics (CG) character is generated later.

An analysis result of the user feature analysis section 30 is stored in the user feature log DB 31 along with a user ID as a user feature log associated with the same time axis as that of a content manipulation log generated by the metadata generation section 25.

(User Feature Log)

Figure 14:
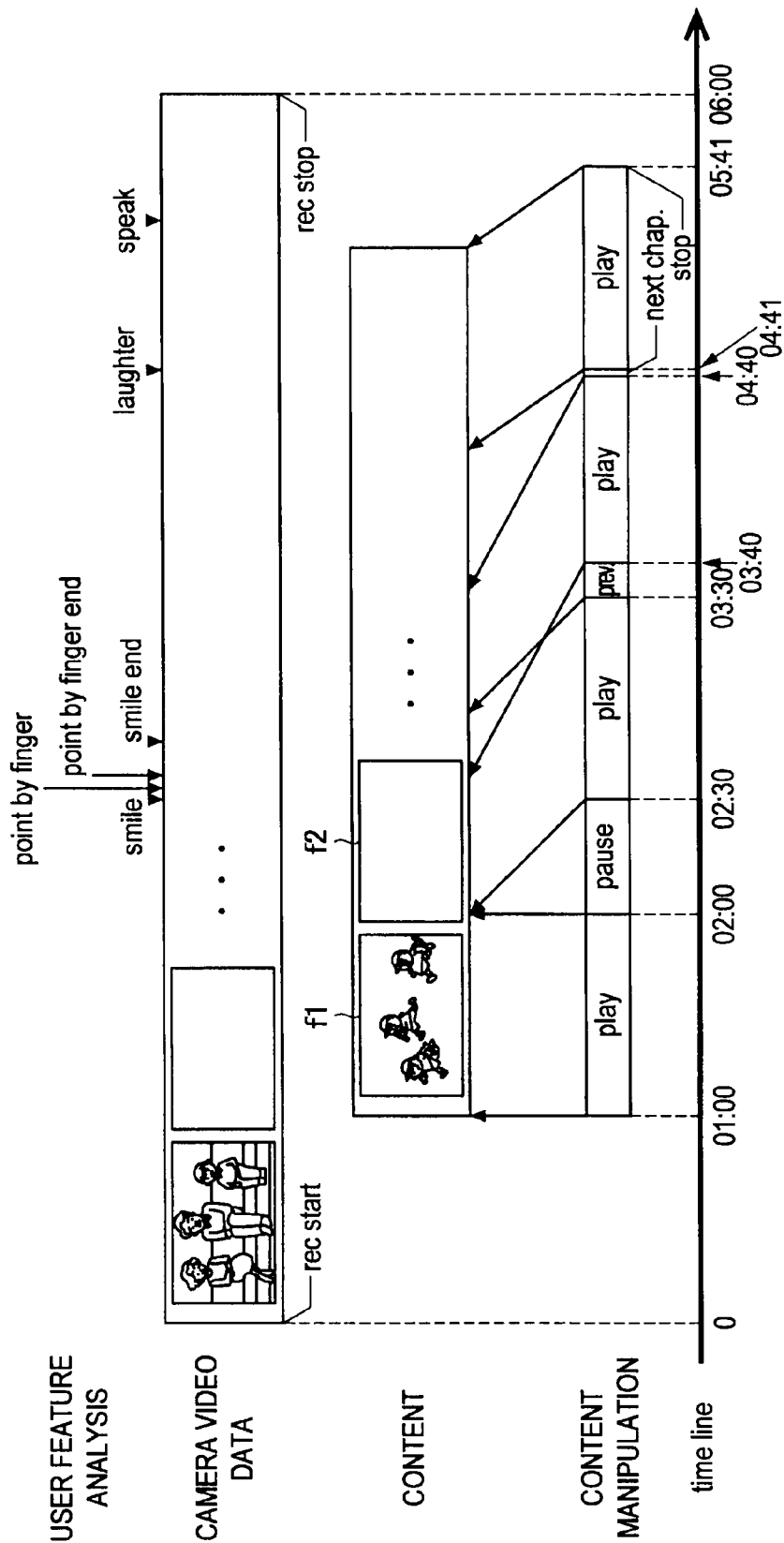
FIG. 14 is a diagram illustrating the case where an imaging time is used as the basis of synchronization according to the same embodiment.

Next, the association of a user feature log and a time axis will be described with reference to FIG. 14. As shown in FIG. 14, a user feature log associated with a time line based on an imaging start time by the camera 41 is generated in this embodiment.

As shown in a user feature analysis of FIG. 14, the time when there is a gesture in which a user smiles (Smiling Face) or points at the screen with her or his finger (Finger Pointing) is associated with the time line based on the imaging start time as a result of camera video data analysis by the user feature analysis section 30. Thereby, for example, a user feature log indicating that a reaction (behavior) of a user is a smile at time 00:02:35:00 or a gesture in which the user points at the screen with his or her finger at time 00:02:40:00 is generated as shown in FIG. 15. As shown in FIG. 15, the user feature log may be further associated with a frame number of content data.

As shown in FIG. 14, it is possible to detect laughter, conversational voice (Speak), or the like as a reaction of a user by analyzing audio data included in camera video data.

(Expression Parameter Generation)

Figure 16:
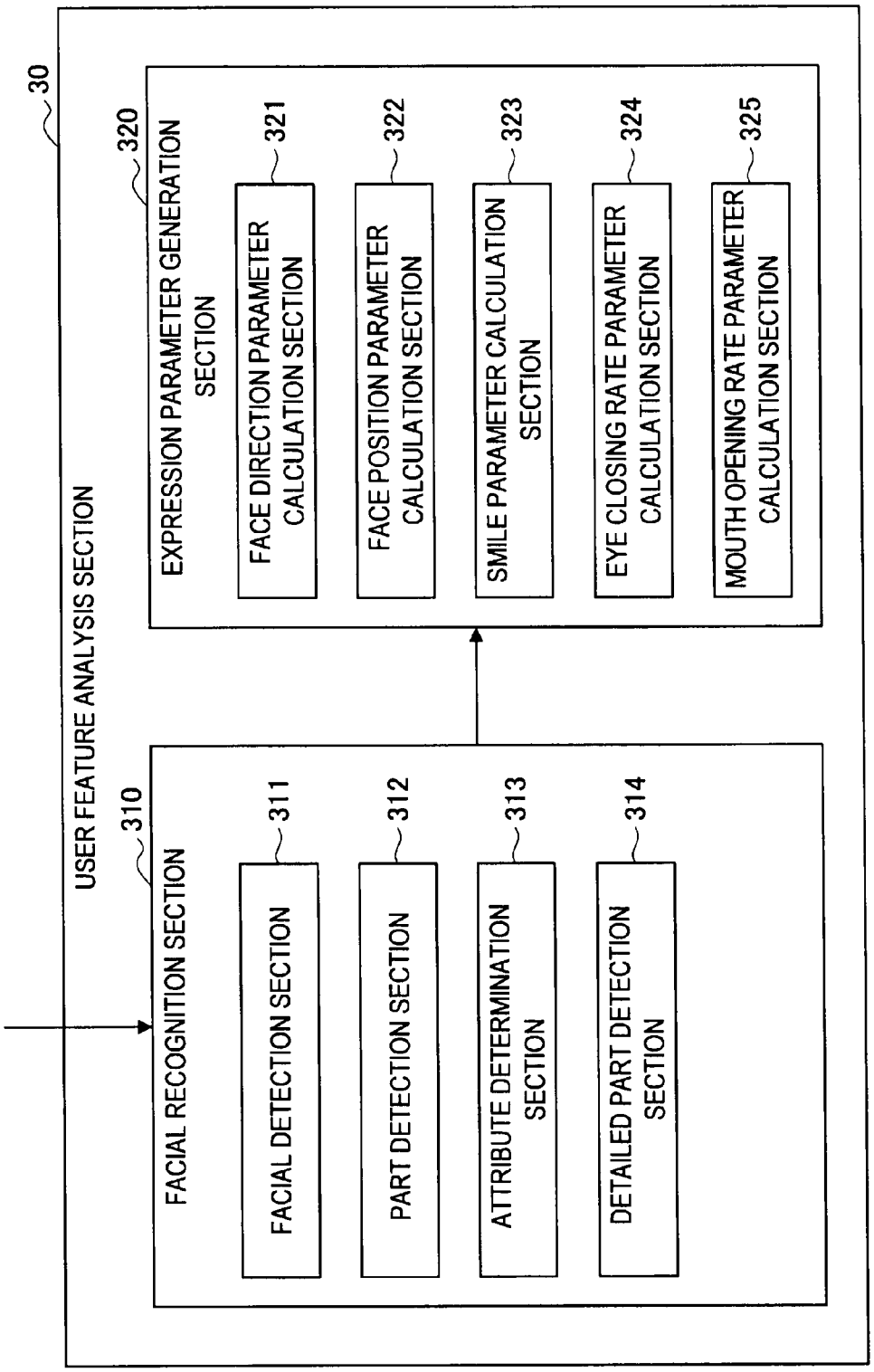
FIG. 16 is a diagram showing a configuration of a user feature analysis section according to the same embodiment.

Next, an example of the configuration of the user feature analysis section 30 when an expression parameter to be used in character generation is generated will be described with reference to FIG. 16. As shown in FIG. 16, the user feature analysis section 30 includes a facial recognition section 310 and an expression parameter generation section 320. The facial recognition section 310 includes a facial detection section 311, a part detection section 312, an attribute determination section 313, and a detailed part detection section 314, and performs a facial recognition process for camera video data. The expression parameter generation section 320 includes a face direction parameter calculation section 321, a face position parameter calculation section 322, a smile parameter calculation section 323, an eye closing rate parameter calculation section 324, and a mouth opening rate parameter calculation section 325, and generates various parameters serving as control data when a character is generated by the data synthesis device 50-2 to be described later.

Specifically, first, the facial detection section 311 performs a face area detection process from an image (each frame) of camera video data. If a face of a user is reflected in an image, face search result information, which is information specifying a face area, is output. The face search result information includes a reference point, a horizontal width, a vertical width, and a rotation angle of the face area.

The part detection section 312 detects each of facial parts (a right eye, a left eye, a nose, and a mouth) within a face area detected by the face detection section 311, and outputs part information, which is information indicating coordinates of a center point of each part.

The attribute determination section 313 determines an attribute of a face displayed in an image on the basis of the part information output from the part detection section 312, and outputs attribute information indicating the attribute of the face. The attribute information includes a smile score, a right (R) eye open score, a left (L) eye open score, a male score, an adult score, a baby score, an elder score, and the like. For example, the smile score is a numeric value indicating a degree of a smile of the face of the user.

The detailed part detection section 314 detects points for specifying parts in detail such as positions or shapes of parts (contours, eyebrows, eyes, a nose, a mouth, and the like) of the face displayed on the image, and outputs part result information, which is information indicating their points. The part result information is XY coordinates indicating a plurality of points, for example, specifying a face contour, an eyebrow shape, an eye contour, a nose shape, and a mouth contour.

Next, the expression parameter generation section 320 generates an expression parameter necessary to generate a character of the face of the user on the basis of information output from the facial recognition section 310. For example, the face direction parameter calculation section 321 calculates a parameter for controlling a face angle of the character from a rotation angle of the face area included in the face search result information output from the face detection section 311.

The face position parameter calculation section 322 calculates a parameter (face position parameter) for controlling a face position of the character from a reference point, a horizontal width, and a vertical width of the face area included in the face search result information output from the facial detection section 311.

The smile parameter calculation section 323 calculates a parameter for controlling a smile rate of the character from the smile score included in the attribute information output from the attribute determination section 313.

The eye closing rate parameter calculation section 324 calculates parameters for controlling closing rates of left and right eyes of the character from open scores of the right and left eyes of the user included in the attribute information output from the attribute determination section 313.

The mouth opening rate parameter calculation section 325 calculates a parameter for controlling an opening rate of a mouth of the character from a plurality of points specifying a contour of a mouth of the user included in the part result information output from the detailed part detection section 314.

The above-described expression parameter is retained in the user feature log DB 31 in a frame unit of the camera video data. For example, the "smile" may be designated, for example, if a numeric value of a calculated smile parameter is a value of 70% or the more, so as to reduce a data amount. Scores (male and adult scores) to be used to select a model for determining whether the face of the user is a male, a female, or a child in the attribute information output from the attribute determination section 313 are also retained.

[2-2. Data Synthesis Device]
(Configuration)

Figure 17:
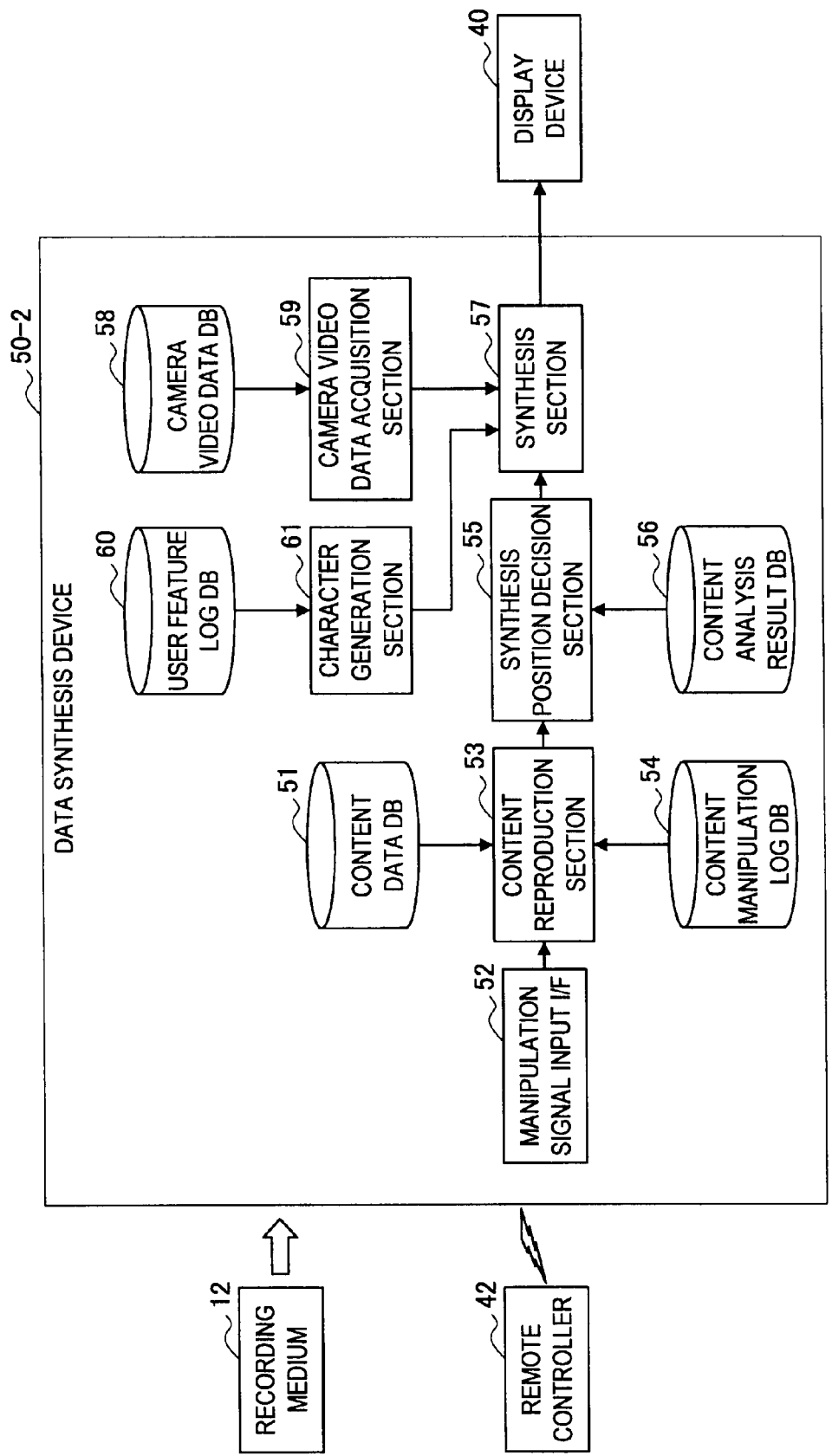
FIG. 17 is a diagram showing a configuration of a data synthesis device according to the same embodiment.

Next, the configuration of the data synthesis device 50-2 according to this embodiment will be described with reference to FIG. 17. As shown in FIG. 17, the data synthesis device 50-2 includes a content data DB 51, a manipulation signal input I/F 52, a content reproduction section 53, a content manipulation log DB 54, a synthesis position decision section 55, a content analysis result DB 56, a synthesis section 57, a camera video data DB 58, a camera video data acquisition section 59, a user feature log DB 60, and a character generation section 61. Hereinafter, each configuration of the data synthesis device 50-2 will be described, but description common to the configuration of the data synthesis device 50-1 according to the above-described first embodiment is omitted.

The user feature log DB 60 stores a user feature log of a first user acquired from the recording medium 12.

The character generation section 61 generates a character on the basis of the expression parameter included in the user feature log stored in the user feature log DB 60 and outputs the character to the synthesis section 57. Details of the character generation section 61 will be described later with reference to FIG. 18.

The synthesis section 57 receiving the generated character from the character generation section 61 synthesizes the character in time synchronization with content data on the basis of the user feature log.

(Character Generation)

Figure 18:
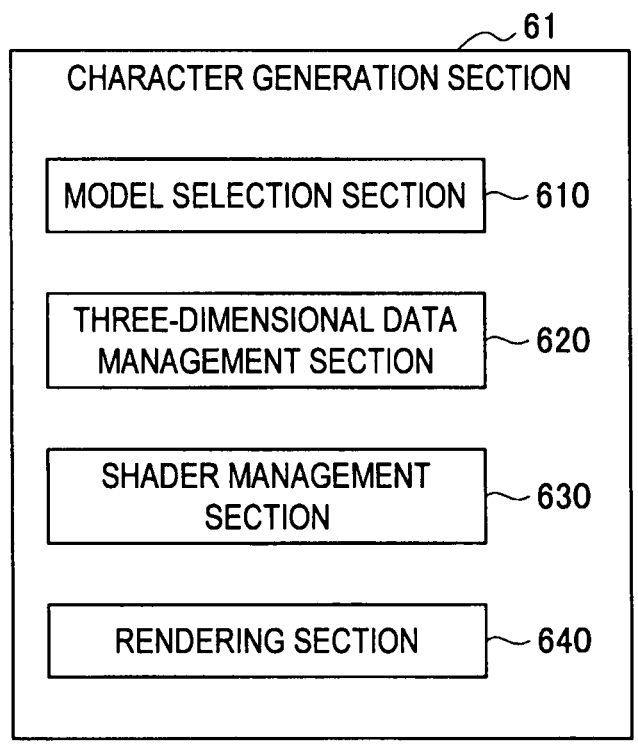
FIG. 18 is a diagram showing a configuration of a character generation section according to the same embodiment.

Next, an example of the configuration of the character generation section 61 will be described with reference to FIG. 18. As shown in FIG. 18, the character generation section 61 includes a model selection section 610, a three-dimensional data management section 620, a shader management section 630, and a rendering section 640. The character generation section 61 according to this embodiment generates an avatar as an example of a character.

The model selection section 610 determines whether a face of a user reflected in camera video data is a male, a female, or a child on the basis of male and adult scores in the attribute information output from the attribute determination section 313 included in user feature logs. Then, the model selection section 610 selects any one of a male model, a female model, and a child model according to a determination result, and outputs model information, which is information indicating a selection result.

The three-dimensional management section 620 performs management of three-dimensional data of avatars, that is, management of a DB (not shown) storing three-dimensional data of avatars of a male, a female, and a child. Model information from the model selection section 610 is provided to the three-dimensional data management section 620. The three-dimensional data management section 620 reads three-dimensional data of an avatar corresponding to model information from the DB and provides the three-dimensional data to the rendering section 640.

The three-dimensional data management section 620 manages various data for performing a geometric process for transforming coordinates of a three-dimensional model into an output image (which is two-dimensional), a texture process for giving texture to a surface of the three-dimensional model, or the like, and provides the data to the rendering section 640.

The shader management section 630 manages a shading process of carrying out an arithmetic operation for shading the three-dimensional model by a predetermined light source (light) when the rendering section renders the three-dimensional data, and provides an arithmetic result by the shading process to the rendering section 640.

The rendering section 640 carries out a rendering operation by morphing the three-dimensional data provided from the three-dimensional data management section 620 according to expression parameters included in user feature logs (for example, parameters indicating eye closing rates of right and left eyes of an avatar, a parameter indicating a smile rate of the avatar, and a parameter indicating a mouth opening rate of the avatar).

An image of a face of the avatar rendered by the rendering section 640 is provided to the synthesis section 57, which synthesizes the image with content data. The content data may be synthesized with only the face of the avatar, and the face of the avatar may be superimposed on only the face of the user according to a face position parameter among camera video data synthesized with the content data.

Figure 19:
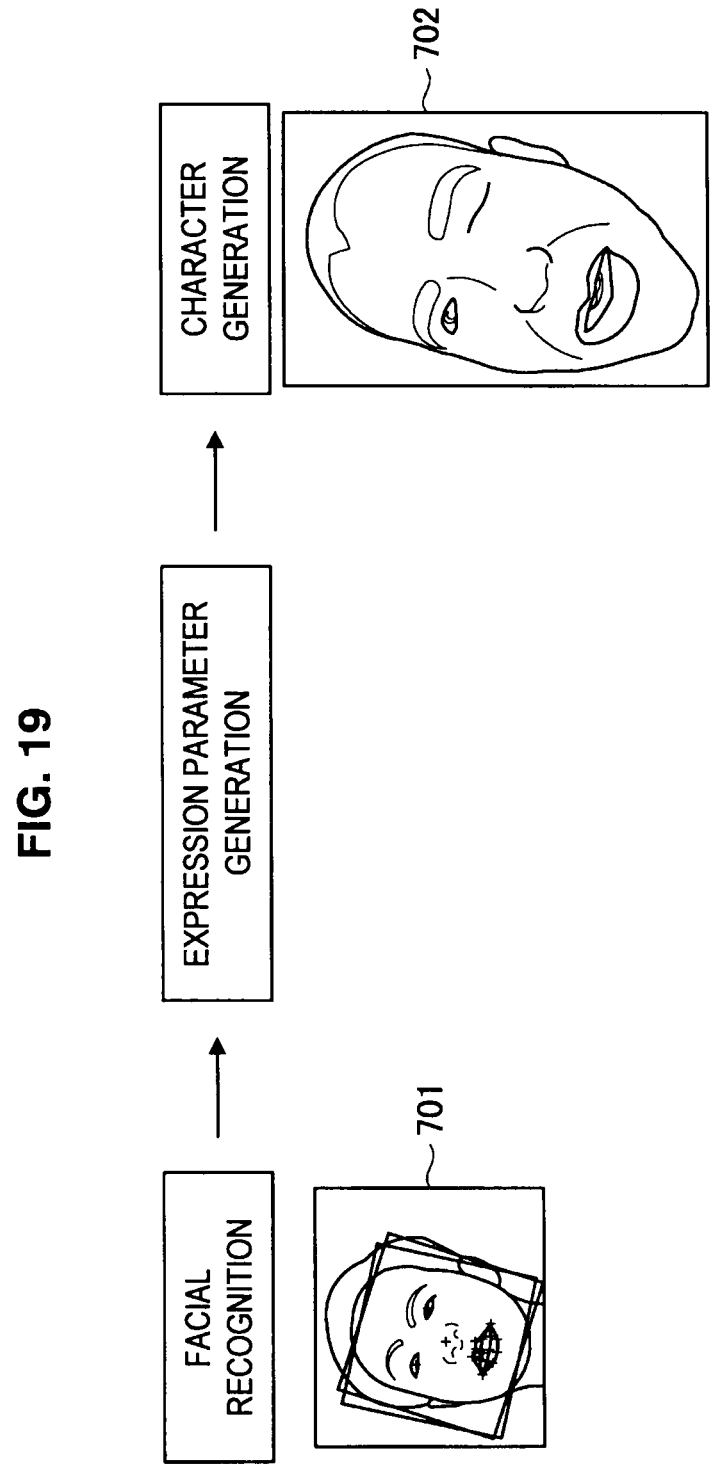
FIG. 19 is a diagram showing a specific example of character generation according to the same embodiment.

A specific example of the above-described character generation will be described with reference to FIG. 19. First, a facial recognition process for an image 701 of FIG. 19 is performed by the facial recognition section 310 of the above-described data generation device 20-2. According to this facial recognition process, a face area detection process, a process of detecting part information, which is information indicating coordinates of a center point of each part of a certain face within a face area, a process of determining attribute information such as a smile score, and a process of detecting part result information for specifying parts of the face (a plurality of points for specifying a mouth contour and the like) in detail are performed.

Next, the expression parameter generation section 320 of the above-described data generation device 20-2 generates expression parameters from information output in the facial recognition process.

Next, the character generation section 61 of the above-described data synthesis device 50-2 generates a face of an avatar as shown in an image 702 according to the attribute information and the expression parameters.

(Synthesis of Camera Video Data Indicating Characteristic Reaction)

On the other hand, the camera video data acquisition section 59 may acquire only camera video data of a point indicating a characteristic reaction such as a smile of a first user on the basis of a user feature log of the first user from the camera video data DB, and output the camera video data to the synthesis section 57. In addition to a smile or a gesture of a user, the characteristic reaction may be determined if an excitement degree calculated from the above-described smile and gesture and audio data is equal to or greater than a fixed value.

The synthesis section 57 receiving the camera video data from the camera video data acquisition section 59 synthesizes the camera video data in time synchronization with content data on the basis of a user feature log.

<3. Third Embodiment (Synthesis in Series)>

Next, a content synchronous reproduction system according to the third embodiment of the present disclosure will be described. In this embodiment, camera video data of the next user watching content synthesized with camera video data or the like of a first watching user is further synthesized.

(Watching by First User)

Figure 20:
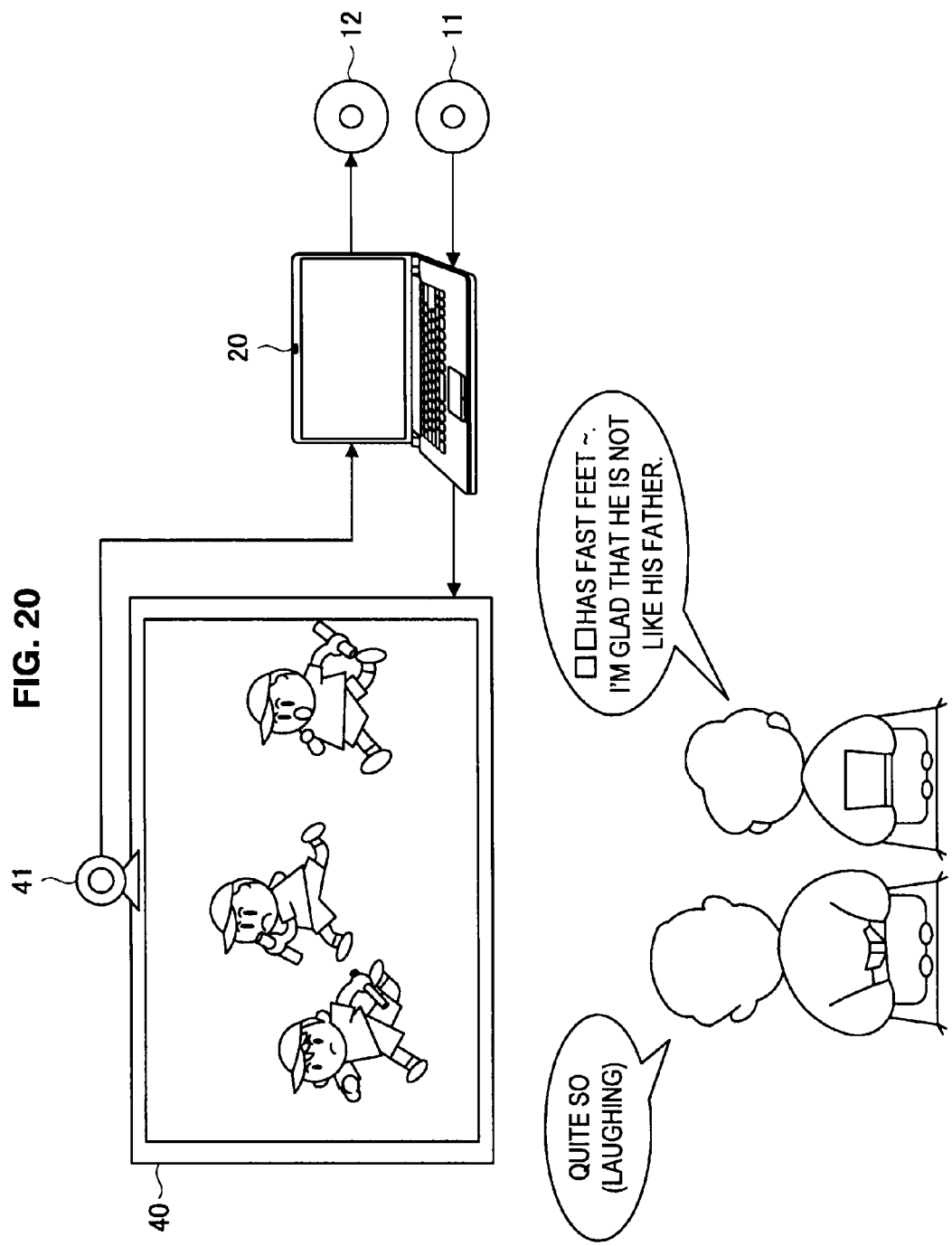
FIG. 20 is a diagram illustrating an overview of a data generation device according to a third embodiment of the present disclosure.

First, as shown in FIG. 20, a data generation device 20 reproduces content data stored in a recording medium 11 and displays the content data on a display device 40. The data generation device 20 acquires camera video data in which first users X (a grandfather and a grandmother) are subjects from a camera 41. The data generation device 20 acquires data of content manipulations performed by the users using a remote controller 42. As described above, a process performed by the data generation device 20 according to this embodiment is the same as those of the data generation devices according to the above-described first and second embodiments.

The data generation device 20 stores content data, camera video data of the users X, manipulation logs, and the like in a recording medium 12. Data is exchanged via the recording medium in this embodiment, but data may be sent via a network.

(Watching by Second User)

Figure 21:
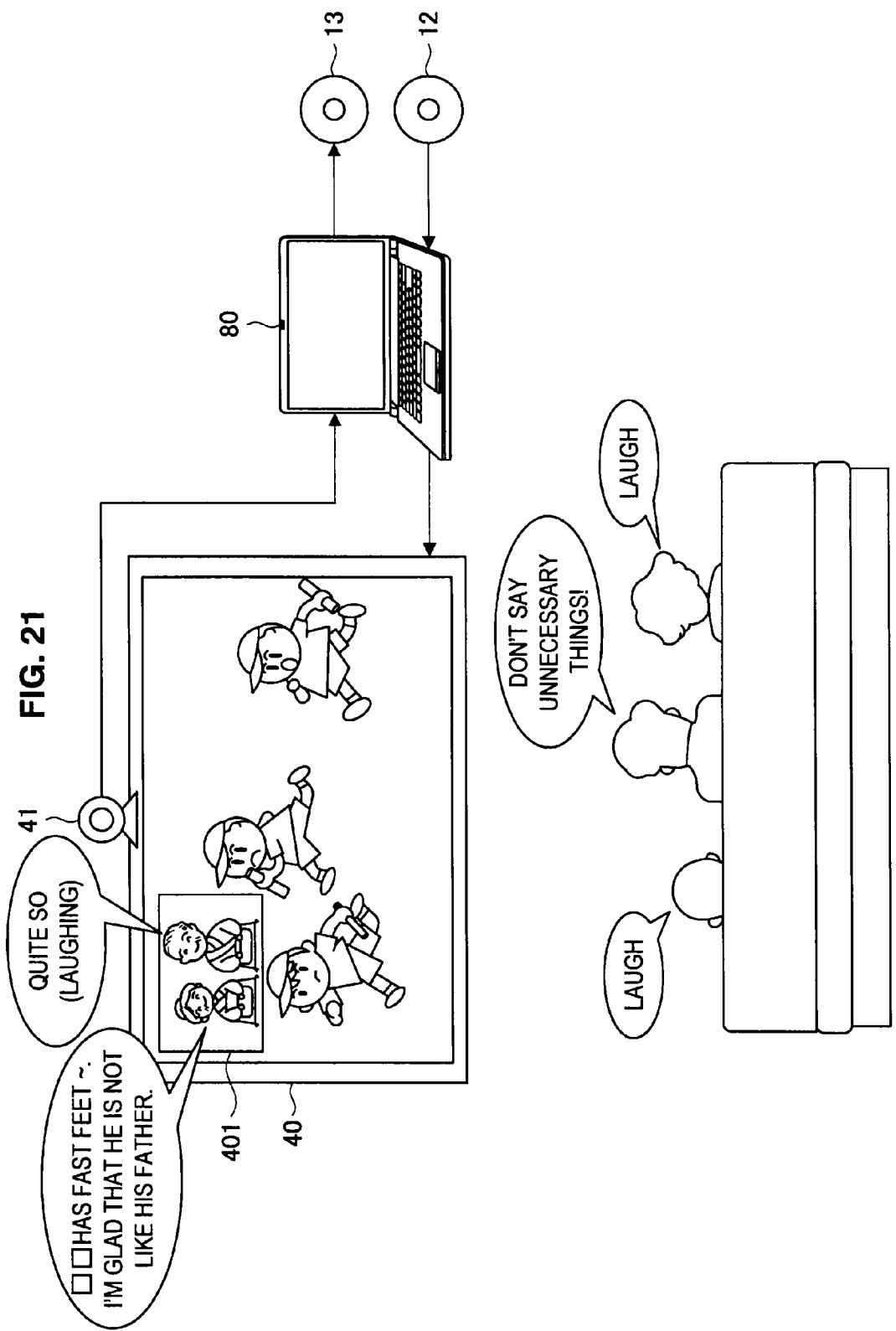
FIG. 21 is a diagram illustrating an overview of a data generation/synthesis device according to the same embodiment.

Next, like the data synthesis devices 50 according to the above-described first and second embodiments, a data generation/synthesis device 80 acquiring data from a recording medium 12 in which the camera video data of the first users or the like is stored reproduces content data according to content manipulation logs of the users X, and synthesizes a camera video x (401) of the users X in time synchronization with content data as shown in FIG. 21.

Here, the data generation/synthesis device 80 according to this embodiment includes a configuration of the data generation device 20 and a configuration of the data synthesis device 50 described in the above-described first and second embodiments, has a function of reproducing synthesis content by synchronizing data, and acquires a content manipulation log of a user who watches the synthesis content and camera video data.

Therefore, the data generation/synthesis device 80 reproduces synthesis content on the display device 40 and acquires camera video data or the like of second users Y (a father, a mother, and a child) imaged by a camera 41 as shown in FIG. 21.

Figure 22:
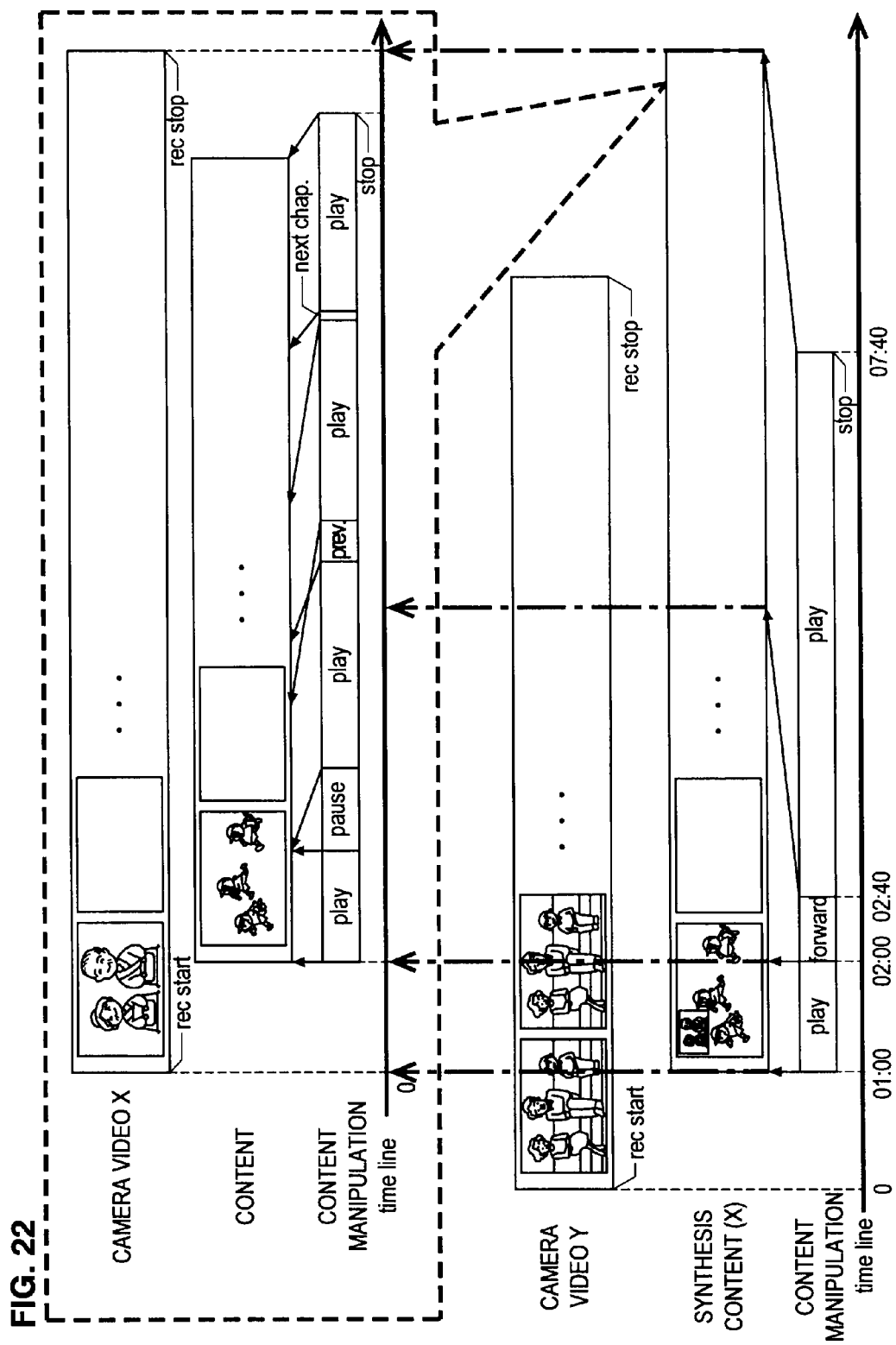
FIG. 22 is a diagram illustrating the case where an imaging time is used as the basis of synchronization according to the same embodiment.

At this time, a metadata generation section (not shown) of the data generation/synthesis device 80 generates a content manipulation log for synthesis content x in association with a time line, for example, based on an imaging start time as shown in FIG. 22. Here, the synthesis content x is content synthesized with the camera video x of the first users X. The content manipulation log may be further associated with a content frame number as shown in FIG. 23.

(Synthesis in Series)

Content manipulation logs of the users Y, a camera video y, and synthesis content x from the above-described data generation/synthesis device 80 are stored in a recording medium 13. On the basis of the above-described data, content synthesized with the content manipulation logs of the users Y or the camera video y is generated. For example, synthesis content 410 is generated by synthesizing the camera video x (401) of the users X and the camera video y (402) of the users Y with content data as shown in FIG. 24.

As shown in FIG. 22, content manipulations of the users Y are associated with a time line of the watching time of the second users Y and a time line within the synthesis content x (see a dashed dotted arrow of FIG. 22). Therefore, in synthesis content data 410 shown in FIG. 24, reproduction of the synthesis content x (content obtained by synthesizing the camera video x (401) with content data) is controlled on the basis of a content manipulation log of the users Y and a content manipulation of the users Y on the synthesis content x is re-created.

Figure 24:
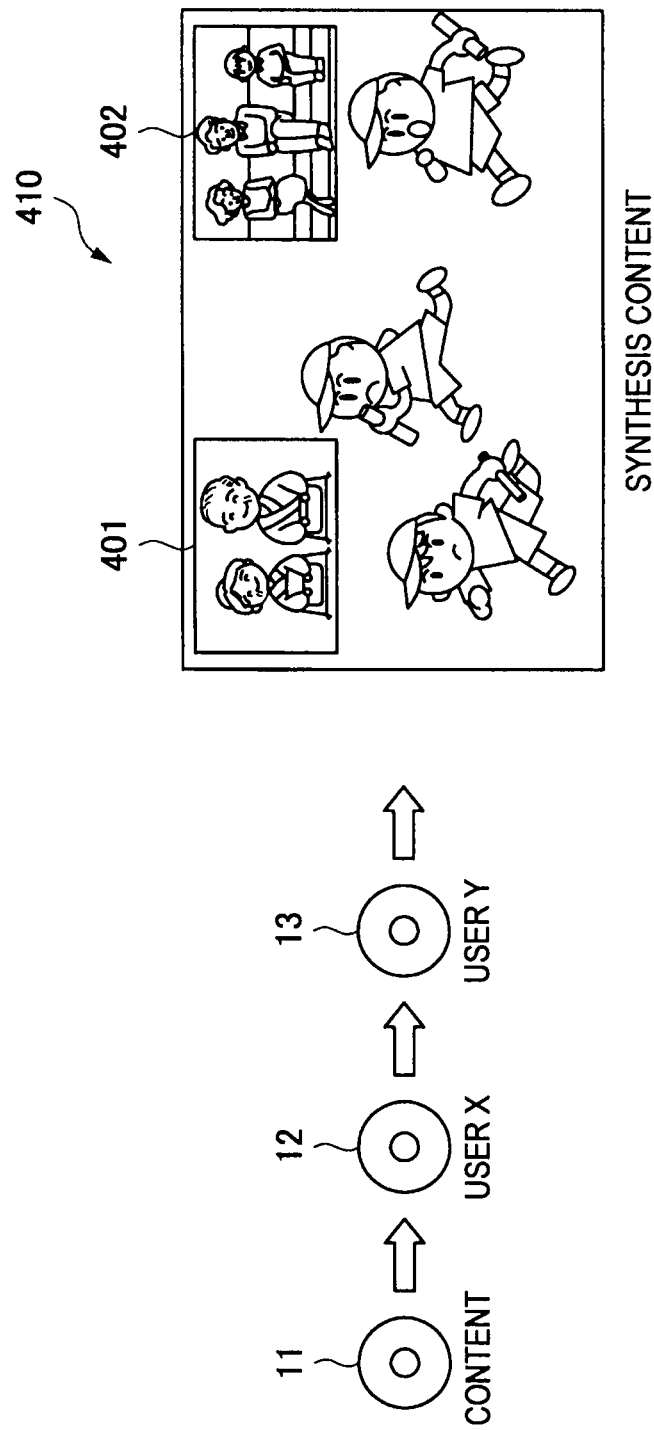
FIG. 24 is a diagram showing a flow of serial synthesis according to the same embodiment.

Content data, camera video data of the users X, content manipulation logs of the users X, camera video data of the users Y, and content manipulation logs of the users Y may be stored in the recording medium 13, and the synthesis content 410 as shown in FIG. 24 may be generated therefrom. In this case, content data, a frame of a camera video x, a content manipulation of the user X, a frame of a camera video y, a content manipulation of the user Y, and the like are synchronized and reproduced, for example, on the basis of a time line of the watching time of the second user Y and a time line of the watching time of the user X corresponding thereto (a time line within synthesis content x) shown in FIG. 22.

<4. Fourth Embodiment (Synthesis in Parallel)>

Next, a content synchronous reproduction system according to the fourth embodiment of the present disclosure will be described. In this embodiment, if a plurality of watching users individually watch the same content without performing a fast-forward, rewind, or skip manipulation or the like on the content, camera video data reflecting users can be synchronized and synthesized with the content data.

Figure 25:
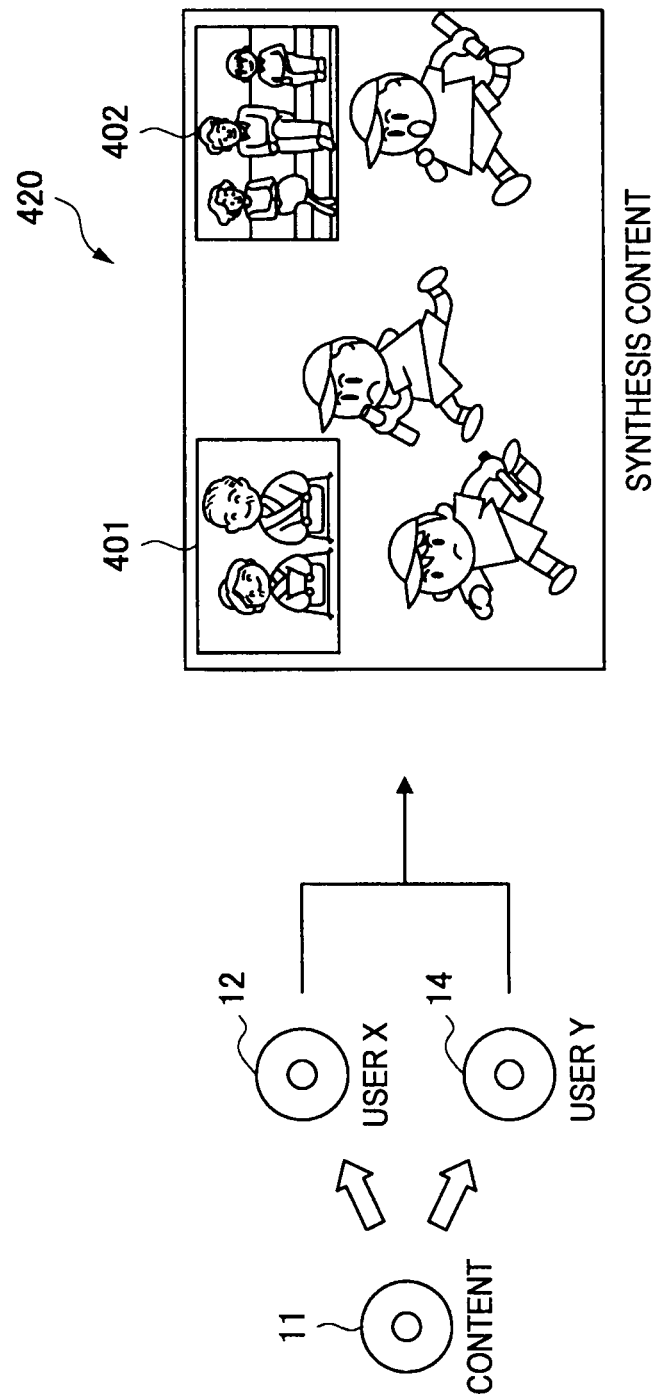
FIG. 25 is a diagram showing a flow of parallel synthesis according to a fourth embodiment of the present disclosure.

For example, as shown in FIG. 25, users X and Y individually watch content (a recording medium 11) and synthesis content data 420 is generated on the basis of respective camera video data (recording media 12 and 14) and the like.

<5. Hardware Configuration of Information Processing Device>

Next, a configuration example of hardware of the information processing device 90 such as the data generation device 20, the data synthesis device 50, or the like, which executes the above-described series of processes by a program, will be described with reference to FIG. 26.

Figure 26:
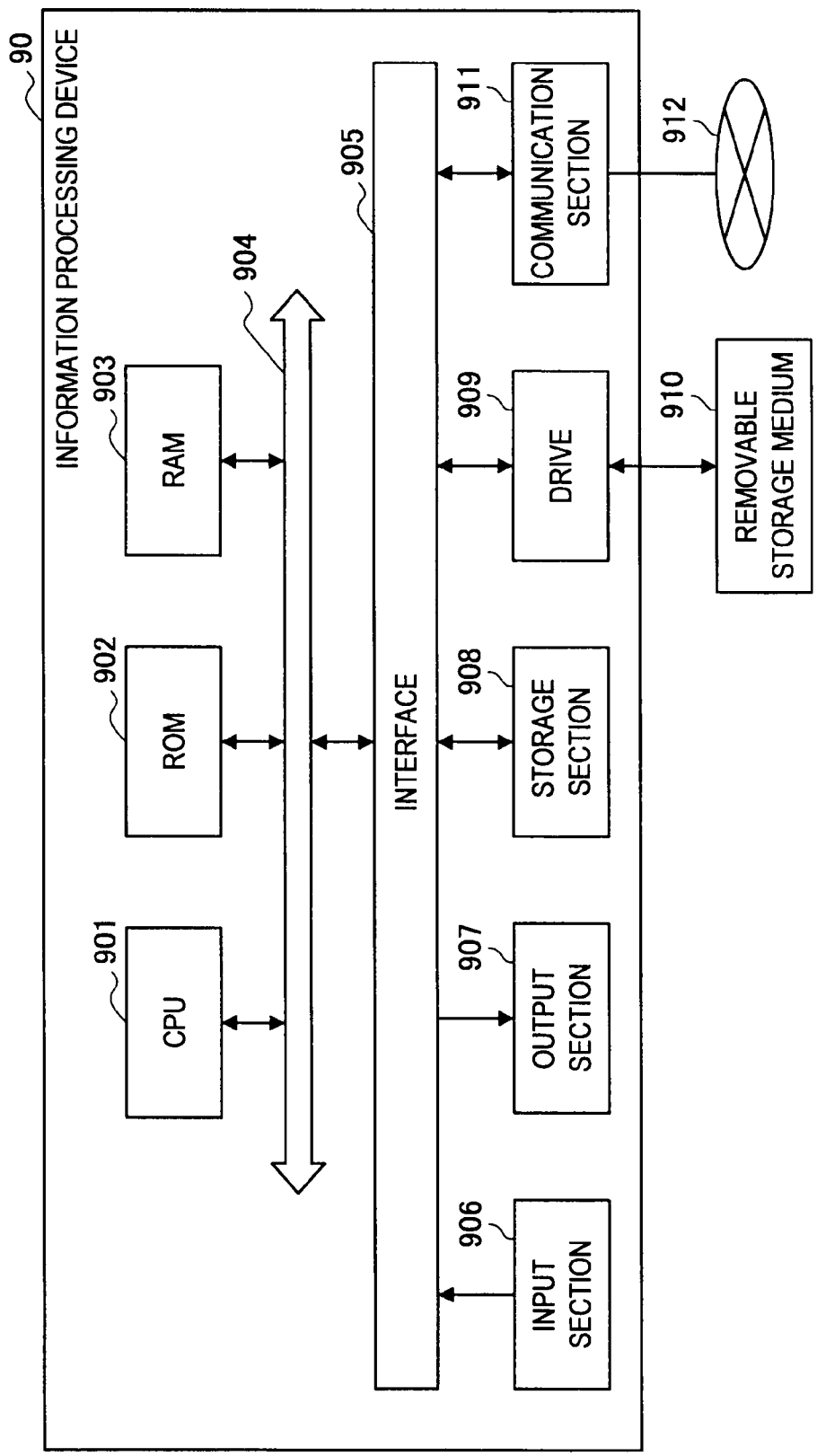
FIG. 26 is a block diagram showing a configuration example of an embodiment of an information processing device to which the present disclosure is applied.

As shown in FIG. 26, the information processing device 90 includes a central processing unit (CPU) 901, a read only memory (ROM) 902, a random access memory (RAM) 903, a host bus 904, an interface 905, an input section 906, an output section 907, a storage section (hard disk drive (HDD)) 908, a drive 909, and a communication section 911.

The CPU 901 functions as an arithmetic processing device and a control device and controls the entire operation within the information processing device 90 according to various programs. Also, the CPU 901 may be a microprocessor. The ROM 902 stores programs, calculation parameters, and the like to be used by the CPU 901. The RAM 903 temporarily stores programs to be used in the execution of the CPU 901 and parameters that change appropriately in the execution. These are interconnected by the host bus 904 including a CPU bus and the like.

The input section 906 includes an input means for allowing a user to input information, such as a mouse, a keyboard, a touch panel, a button, a microphone, a switch, and a lever and an input control circuit for generating an input signal based on an input by the user and outputting the input signal to the CPU 901. The user of the information processing device 90 can input various data, and give a processing operation instruction, to the information processing device 90 by manipulating the input section 906.

The output section 907 includes, for example, a display device such as a cathode ray tube (CRT) display, a liquid crystal display (LCD), an organic light emitting display (OLED) and a lamp, and audio output devices such as speakers and headphones. The output section 907 outputs, for example, reproduced content. Specifically, the display device displays various information such as reproduced video data or the like as text or images. On the other hand, the audio output device audibly converts and outputs reproduced audio data.

The storage section 908 is a data storage device configured as an example of a storage section of the information processing device 90 according to this embodiment. The storage device 908 may include a storage medium, a recording device for recording data in the storage medium, a reading device for reading the data from the storage medium, an erase device for erasing the data recorded in the storage medium, and the like. The storage section 908 includes, for example, an HDD. This storage section 908 drives a hard disk and stores the programs to be executed by the CPU 901 or various data. Content data, camera video data, metadata, a content analysis result, and the like are recorded in the storage section 908.

The drive 909 is a storage medium reader/writer, and is embedded in the information processing device 90 or attached to an outside. The drive 909 reads information recorded in a removable recording medium 910 attached thereto such as a magnetic disk, an optical disc, a magneto-optical disc, or a semiconductor memory, and outputs the information to the RAM 903.

The communication section 911 is, for example, a communication interface including a communication device or the like for connecting to a communication network 912. Also, the communication section 911 may be a communication device corresponding to a wireless local area network (LAN), a communication device corresponding to a wireless USB, or a wired communication device, which performs wired communication. The communication section 911 transmits/receives various data such as content data and the like to/from an external device via the communication network 912.

<6. Summary>

Because the data generation device 20 and the data synthesis device 50 according to the embodiments of the present disclosure as described above can add an appearance or reaction of a user watching content to the content, it is possible to enjoy content any number of times and generate new added value in content.

The appearance or reaction of the user can be added using camera video data in which the user who watches content is an imaging target or manipulation data of a play, fast-forward, or rewind manipulation or the like on content.

Upon content reproduction, the above-described camera video data or content manipulation data can be synchronized using a camera log or a content manipulation log associated with an elapsed time from an imaging start time.

If a method of generating a character from a video of a watching user and displaying the character is used, it is possible to reduce a volume of data as compared with the case where camera video data is output from the data generation device 20 to the data synthesis device 50. Even in a system that temporarily retains information such as a content manipulation log from the data generation device 20 in a server device on a network, it is possible to protect privacy as compared with the case where camera video data is retained.

It should be understood by those skilled in the art that various modifications, combinations, sub-combinations and alterations may occur depending on design requirements and other factors insofar as they are within the scope of the appended claims or the equivalents thereof.

For example, the steps of the processes of the data generation device 20 and the data synthesis device 50 of this specification are not necessarily processed in a time line according to the order described as the flowchart. For example, the steps of the process of the data generation device 20 shown in FIG. 4 may be processed in an order different from the order described as the flowchart or may be processed in parallel.

It is possible to create a computer program for causing hardware embedded in the data generation device 20 and the data synthesis device 50 to implement functions equivalent to the configurations of the data generation device 20 and the data synthesis device 50. A storage medium storing the computer program is also provided.

The invention claimed is:

1. An information processing system, comprising:
  a first apparatus operable to:
    reproduce content;
    acquire behavior data corresponding to a viewer of the reproduced content, wherein the behavior data comprises captured video data of the viewer during the reproduction of the content; and
    store the acquired behavior data and synchronization data indicating a timing of the reproduced content with respect to the acquired behavior data; and a second apparatus operable to:
    reproduce the content along with reproducing the acquired behavior data based on the stored synchronization data, wherein the second apparatus is operable to detect a face area of the viewer from the captured video data, and reproduce the content along with the detected face area based on the stored synchronization data.

2. The information processing system of claim 1, wherein the behavior data comprises manipulation data indicating one or more of: a play, pause and fast-forward operation performed on the content reproduced by the first apparatus.

3. The information processing system of claim 2, wherein the second apparatus is operable to reproduce the content in accordance with the manipulation data based on the stored synchronization data.

4. The information processing system of claim 1, wherein the content is one or more of: still image data, music data, game data and video data.

5. The information processing system of claim 1, wherein the synchronization data is metadata generated by the first apparatus.

6. The information processing system of claim 1, wherein the synchronization data comprises an association between a start time of acquisition of the behavior data and a start time of reproduction of the content by the first apparatus.

7. The information processing system of claim 1, wherein the synchronization data comprises an association between the acquired behavior data and a frame of the content reproduced by the first apparatus.

8. The information processing system of claim 1, wherein the first apparatus is configured to detect subject area from the reproduced content.

9. The information processing system of claim 8, wherein the first apparatus extracts at least one of luminance information, color information, edge information, face information and motion information to generate a subject map that specifies the subject area.

10. The information processing system of claim 8, wherein the subject area is a face area or a dynamic subject area of the reproduced content.

11. The information processing system of claim 8, wherein the second apparatus is operable to reproduce the content with the behavior data so that the behavior data does not overlap the detected subject area.

12. The information processing system of claim 1, wherein the first apparatus is operable to detect a characteristic of the viewer from the acquired behavior data.

13. The information processing system of claim 12, wherein the first apparatus is operable to generate feature information corresponding to the detected characteristic of the viewer.

14. The information processing system of claim 12, wherein the first apparatus is operable to store the detected characteristic and the synchronization data indicating the timing of the reproduced content corresponding to the detected characteristic.

15. The information processing system of claim 1, wherein the second apparatus is operable to generate a graphic corresponding to a generated feature information, and reproduce the content with the generated graphic based on the stored synchronization data.

16. The information processing system of claim 1, wherein the second apparatus is operable to:
reproduce the content with the behavior data based on the stored synchronization data;
acquire second behavior data corresponding to a second viewer of the reproduced content; and
store the acquired second behavior data and second synchronization data indicating a timing of the reproduced content with respect to the acquired second behavior data.

17. The information processing system of claim 1, wherein the behavior data is acquired when determining that the viewer is watching the reproduced content.

18. An information processing method, comprising:
reproducing content by a first apparatus;
acquiring, by the first apparatus, behavior data corresponding to a viewer of the reproduced content, wherein the behavior data comprises captured video data of the viewer during the reproduction of the content;
storing, at the first apparatus, the acquired behavior data and synchronization data indicating a timing of the reproduced content with respect to the acquired behavior data; and
reproducing, by a second apparatus, the content along with reproducing the acquired behavior data based on the stored synchronization data, wherein the second apparatus is operable to detect a face area of the viewer from the captured video data, and reproduce the content along with the detected face area based on the stored synchronization data.

19. A non-transitory computer-readable medium having stored thereon, a computer program having at least one code section for information processing, the at least one code section being executable by one or more processors for causing a computer to perform steps comprising:
reproducing content at an apparatus;
acquiring behavior data corresponding to a viewer of the reproduced content, wherein the behavior data comprises captured video data of the viewer during the reproduction of the content, wherein when the content is reproduced along with reproducing the acquired behavior data at another apparatus, a face area of the viewer is detected from the captured video data and the detected face area is reproduced along with the content; and
storing the acquired behavior data and synchronization data indicating a timing of the reproduced content with respect to the acquired behavior data.

20. An information processing system, comprising:
a first apparatus operable to:
reproduce content;
acquire behavior data corresponding to a viewer of the reproduced content, wherein the behavior data comprises captured video data of the viewer during the reproduction of the content, wherein the behavior data comprises manipulation data indicating one or more of: a play, pause or fast-forward operation performed on the content reproduced by the first apparatus; and
store the acquired behavior data and synchronization data indicating a timing of the reproduced content with respect to the acquired behavior data; and a second apparatus operable to:
reproduce the content with the acquired behavior data based on the stored synchronization data, wherein the second apparatus is operable to detect a face area of the viewer from the captured video data, and reproduce the content with the detected face area based on the stored synchronization data.

* * * * *